(12) United States Patent
Ahmed et al.

(10) Patent No.: US 10,940,384 B2
(45) Date of Patent: Mar. 9, 2021

(54) INCITING USER ACTION FOR MOTION SENSOR CALIBRATION

(71) Applicant: InvenSense, Inc., San Jose, CA (US)

(72) Inventors: Jibran Ahmed, Calgary (CA); Karthik Katingari, Milpitas, CA (US); Hemabh Shekhar, San Jose, CA (US); Joe Youssef, Santa Clara, CA (US)

(73) Assignee: InvenSense, Inc., San Jose, CA (US)

( * ) Notice: Subject to any disclaimer, the term of this patent is extended or adjusted under 35 U.S.C. 154(b) by 95 days.

(21) Appl. No.: 15/907,379

(22) Filed: Feb. 28, 2018

(65) Prior Publication Data

US 2018/0345128 A1 Dec. 6, 2018

Related U.S. Application Data

(60) Provisional application No. 62/515,635, filed on Jun. 6, 2017.

(51) Int. Cl.
*A63F 13/24* (2014.01)
*A63F 13/211* (2014.01)
*A63F 13/537* (2014.01)
*A63F 13/22* (2014.01)

(52) U.S. Cl.
CPC .......... *A63F 13/211* (2014.09); *A63F 13/22* (2014.09); *A63F 13/537* (2014.09); *A63F 2300/8082* (2013.01)

(58) Field of Classification Search
CPC .............................. A63F 13/211; A63F 13/22
See application file for complete search history.

(56) References Cited

U.S. PATENT DOCUMENTS

| 7,104,129 | B2 | 9/2006 | Nasiri et al. | |
|---|---|---|---|---|
| 2010/0273461 | A1* | 10/2010 | Choi | H04M 1/72522 |
| | | | | 455/414.1 |
| 2010/0279768 | A1* | 11/2010 | Huang | A63F 13/22 |
| | | | | 463/31 |
| 2010/0280783 | A1* | 11/2010 | Streibel | G01P 21/00 |
| | | | | 702/104 |
| 2011/0053641 | A1* | 3/2011 | Lee | G06F 1/1626 |
| | | | | 455/556.1 |
| 2011/0277532 | A1* | 11/2011 | Bartholomeyczik | G01P 15/18 |
| | | | | 73/1.38 |
| 2012/0285274 | A1* | 11/2012 | Almalki | G04G 21/02 |
| | | | | 73/866.3 |
| 2013/0023341 | A1* | 1/2013 | Yamanouchi | G06F 3/0304 |
| | | | | 463/31 |

(Continued)

OTHER PUBLICATIONS

U.S. Appl. No. 12/106,921, filed Apr. 21, 2008.

*Primary Examiner* — Omkar A Deodhar
*Assistant Examiner* — Shauna-Kay Hall

(57) ABSTRACT

In a method of motion sensor calibration, a motion with which to calibrate a motion sensor is determined. The motion sensor is controlled by a sensor processor and the motion sensor is comprised within a user interface that is coupled with a gaming engine. The sensor processor and the gaming engine coordinate regarding the motion. The sensor processor monitors the motion sensor for evidence of the motion made as a user input via the user interface in response to game content implemented by the gaming engine, based on the coordination, to incite the motion. The sensor processor calibrates the motion sensor with the motion.

21 Claims, 15 Drawing Sheets

(56) References Cited

U.S. PATENT DOCUMENTS

| | | | | |
|---|---|---|---|---|
| 2013/0072297 A1* | 3/2013 | Seegers | .................. | A63F 13/06 |
| | | | | 463/31 |
| 2013/0196767 A1* | 8/2013 | Garvin | ................... | A63F 13/04 |
| | | | | 463/36 |
| 2013/0234926 A1* | 9/2013 | Rauber | ................ | G06F 3/0487 |
| | | | | 345/156 |

* cited by examiner

1300

DETERMINING A MOTION WITH WHICH TO CALIBRATE A MOTION SENSOR, WHEREIN THE MOTION SENSOR IS CONTROLLED BY A SENSOR PROCESSOR, AND WHEREIN THE MOTION SENSOR IS COMPRISED WITHIN A USER INTERFACE, THE USER INTERFACE COMMUNICATIVELY COUPLED WITH A GAMING ENGINE
1310

COORDINATING BETWEEN THE SENSOR PROCESSOR AND THE GAMING ENGINE REGARDING THE MOTION
1320

MONITORING, BY THE SENSOR PROCESSOR, THE MOTION SENSOR FOR THE MOTION MADE AS A USER INPUT VIA THE USER INTERFACE IN RESPONSE TO GAME CONTENT IMPLEMENTED BY THE GAMING ENGINE, BASED ON THE COORDINATION, TO INCITE THE MOTION
1330

CALIBRATING, BY THE SENSOR PROCESSOR, THE MOTION SENSOR WITH THE MOTION
1340

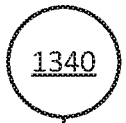

COMPARING AN INTENDED USER INPUT IN RESPONSE TO THE GAME CONTENT WITH AN ACTUAL USER INPUT IN RESPONSE TO THE GAME CONTENT, THE ACTUAL USER INPUT MEASURED BY THE MOTION SENSOR
1350

ADAPTING THE GAME CONTENT BASED ON THE COMPARISON
1360

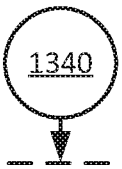

COMPARING PERFORMANCE OF THE MOTION SENSOR BEFORE AND AFTER THE CALIBRATING TO DETERMINE A PERFORMANCE CHANGE OF THE MOTION SENSOR DUE TO THE CALIBRATING
1370

OBSERVING PERFORMANCE OF THE MOTION SENSOR
1380

RESPONSIVE TO THE PERFORMANCE BEING OUTSIDE OF A PREDETERMINED RANGE, INITIATING THE DETERMINING
1390

COORDINATING BETWEEN A PROCESSOR AND A USER INTERFACE DEVICE REGARDING A MOTION OF A USER INTERFACE WITH WHICH TO CALIBRATE A MOTION SENSOR DISPOSED AS A PORTION OF THE USER INTERFACE
1410

BASED ON THE COORDINATION, GENERATING GAME CONTENT BY THE PROCESSOR, THE GAME CONTENT CONFIGURED TO INCITE THE MOTION AS AN INPUT VIA THE USER INTERFACE FROM A USER OF A GAME IMPLEMENTED BY A GAMING ENGINE OPERATING ON THE PROCESSOR
1420

PROVIDING, BY THE PROCESSOR, THE GAME CONTENT FOR GAME PLAY BY THE USER
1430

INCITING USER ACTION FOR MOTION SENSOR CALIBRATION

CROSS-REFERENCE TO RELATED APPLICATION—PROVISIONAL

This application claims priority to and benefit of U.S. Provisional Patent Application No. 62/515,635 filed on Jun. 6, 2017 entitled "Inciting User Actions for Calibration," by Jibran Ahmed, Karthik Katingari, Hemabh Shekhar, and Joe Youssef, and assigned to the assignee of the present application, the disclosure of which is hereby incorporated herein by reference in its entirety.

BACKGROUND

Advances in technology have enabled the introduction of electronic devices, electronic systems and/or user interfaces of electronic devices/systems feature an ever-increasing set of capabilities, applications, and services to users. Many of these capabilities, applications, and services are enabled by sensors that are included in the electronic device/system and/or user interface. The sensors may be used to capture or determine any type of physical or environmental parameter. For example, motion or inertial sensors, such as accelerometers, gyroscopes, and magnetometers, may be used to measure the motion, movement, orientation, of the device and/or activity of the user of the device/system/user interface—particularly when the device/system/user interface is a mobile. Image and audio sensors may be used to capture images, videos, and record sound. Other sensors, such as, for example, pressure sensors, proximity sensors, temperature sensors, and the like may each provide additional information related to the device/system/user interface, the user, the user's activities, or the user's environment.

Many of these electronic systems include or communicatively couple with electronic devices and/or user interfaces, and many of the electronic devices are mobile electronic devices and many of the user interfaces are also mobile (hand-holdable, wearable, or the like). The mobile electronic devices/user interfaces may include, without limitation, smart phones, smart wristwatches, video game controllers, augmented reality/virtual reality (AR/VR) devices such as head mounted displays (HMDs), digital cameras, notebook/laptop computers, tablet computers, media players, navigation devices, multi-media communication devices, AR/VR controllers, and remote controls. A mobile electronic device may be a handheld device that a user may carry around, or wearable that a user may wear on the user's body or clothing. A user interface may be part of an electronic device (or mobile electronic device) or an electronic system, or may be communicatively coupled thereto. Similarly, a mobile electronic device may be communicatively coupled to another device or system such as a computer, a drone, or an automobile.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 13A-13D illustrate a flow diagram of an example method of motion sensor calibration, in accordance with various aspects of the present disclosure.

FIG. 14 illustrates a flow diagram of an example method a method of game content generation, in accordance with various aspects of the present disclosure.

DESCRIPTION OF EMBODIMENTS

Figure 1:
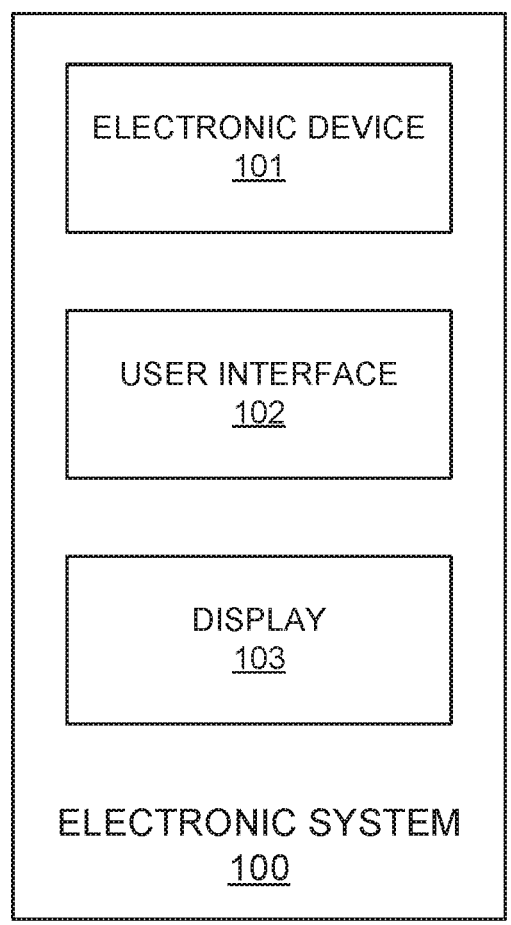
FIG. 1 shows a block diagram of an electronic system which includes an electronic device, a user interface, and a display, in accordance with various aspects of the present disclosure.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

Information and/or data from sensors in electronic devices/systems and/or user interfaces is most valuable (and sometimes only valuable) if the information and/or data is correct and can be relied upon. Motion sensors and other sensors used in many modern devices/systems and/or user interfaces thereof are typically small, low cost components that may require calibration to perform accurately and thus provide reliable information and data. This calibration may be required due a variety of reasons that include but are not limited to: lapse of time since last calibration, change in operating temperature, change of a user, change or start of (gaming) application, occurrence of a certain quantity of motion, exceeding a motion threshold (e.g., an extreme a movement that is too far in a direction or/or too fast such as a shock), and degradation in operation of a sensor (e.g., detrimental changes in drift, tilt, bias, and/or sensitivity).

Rather than entering a special calibration mode/application that is separate from any other operating mode/application and/or explicitly instructing a user on how to perform one or more actions (such as motions) required for calibration of the sensor(s) disposed in an electronic device/system and/or user interface, the present disclosure describes techniques for using content of an application to incite the actions needed for sensor calibration. The application is one that is not used strictly for calibration, such as a game. Further, the application may already be running and content of the application (such as gameplay) is simply generated to incite the required user action(s). That is, the gameplay that is being generated is modified to incite the required user action(s). By inciting the action(s), such as motion(s) made as user input, the sensor calibration described herein does not take time away from other activities by requiring an application to be closed to accomplish calibration, requiring calibration to be performed prior to an application (such as a game) being opened or starting play, or explicitly requesting a user to perform certain movements for calibration. Instead, the disclosed techniques allow other operations with the device and/or user interface to continue while the calibration is taking place. Further, instead of explicitly asking the user to perform a certain action to assist in sensor calibration, the techniques described herein anticipate a certain reaction from the user in response to application content generated and provided to incite that reaction. In other words, the user is incited, implicitly or indirectly, to then perform a certain action. The techniques described herein then use the opportunity of the incited action to perform the required sensor calibration, without the user realizing that calibration is taking place. The techniques described herein improve the performance of user interfaces and the computer systems/electronic devices which utilize them. The techniques disclosed herein also improve and enhance the user experience with and functioning of an electronic system, electronic device, user interface, and/or application in several ways, including: facilitating a user entering an application more quickly (without sidetracking to calibrate sensors prior to entering the application), eliminating the need for a user to exit or pause an application to conduct sensor calibration, and facilitating seamless runtime calibration of sensors when needed to optimize sensor performance.

Discussion begins with a description of notation and nomenclature. Discussion continues with description of an example electronic system, which includes an electronic device a user interface and a display. An example electronic device, which in some embodiments may be included in and/or communicatively coupled with the electronic system, is described. An example of a user interface, which in some embodiments may be included in and/or communicatively coupled with the electronic system, is described. An example of a sensor processing unit is described. Some non-limiting depictions of physical form factors of user interfaces and displays are presented. Several methods for sensor calibration are discussed and some example game content generated to incite user action is depicted. Finally, operation of the electronic system, electronic device, user interface, display, and/or sensor processing unit is then further described in conjunction with description of an example method of motion sensor calibration and with description of an example method of game content generation.

Notation and Nomenclature

Some portions of the detailed descriptions which follow are presented in terms of procedures, logic blocks, processing and other symbolic representations of operations on data bits within a computer memory. These descriptions and representations are the means used by those skilled in the electronic arts, programming arts, and data processing arts to most effectively convey the substance of their work to others skilled in the art. A procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "coordinating," "monitoring," "calibrating," "comparing," "adapting," "observing," "initiating," "providing," "receiving," "controlling," "calibrating," "sending," "initiating," "generating," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

Embodiments described herein may be discussed in the general context of processor-executable instructions residing on some form of non-transitory processor-readable medium, such as program modules or logic, executed by one or more computers, processors, or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example electronic device(s) described herein may include components other than those shown, including well-known components.

The techniques described herein may be implemented in hardware, or a combination of hardware with firmware and/or software, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, cause a processor and/or other components to perform one or more of the methods described herein. The non-transitory processor-readable data storage medium may form part of a computer program product, which may include packaging materials.

The non-transitory processor-readable storage medium may comprise random-access memory (RAM) such as synchronous dynamic random-access memory (SDRAM), read only memory (ROM), non-volatile random-access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more sensor processing units (SPUs), application processor(s) or core(s) thereof, digital signal processors (DSPs), graphics processing units (GPUs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, one or more aspects of the functionality described herein may be provided within dedicated software modules or hardware modules configured as described herein. Also, the techniques can be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of a SPU and a microprocessor, a plurality of microprocessors, one or more microprocessors in conjunction with a core of a SPU, or any other such configuration. One or more components of an SPU or electronic device described herein may be embodied in the form of one or more of a "chip," a "package," an Integrated Circuit (IC).

In various example embodiments discussed herein, a "chip" is defined to include at least one substrate typically formed from a semiconductor material. A single chip may for example be formed from multiple substrates, where the substrates are mechanically bonded to preserve the functionality. Multiple chip (or multi-chip) includes at least two substrates, wherein the two substrates are electrically connected, but do not require mechanical bonding.

A package provides electrical connection between the bond pads on the chip (or for example a multi-chip module) to a metal lead that can be soldered to a printed circuit board (or PCB). A package typically comprises a substrate and a cover. An Integrated Circuit (IC) substrate may refer to a silicon substrate with electrical circuits, typically CMOS circuits. A MEMS substrate provides mechanical support for the MEMS structure(s). The MEMS structural layer is attached to the MEMS substrate. The MEMS substrate is also referred to as a handle substrate or handle wafer. In some embodiments, the handle substrate serves as a cap to the MEMS structure.

In the described embodiments, an electronic device/system incorporating a sensor may, for example, employ a sensor processing unit (SPU) that includes at least one sensor in addition to electronic circuits. The at least one sensor may comprise any of a variety of sensors, such as for example a gyroscope, a magnetometer, an accelerometer, a microphone, a pressure sensor, a proximity sensor, a moisture sensor, a temperature sensor, a biometric sensor, an ultrasonic sensor, and/or an ambient light sensor, among others known in the art. In some embodiments, all of the SPU may be embodied in a single integral package while, in other embodiments, some components may be distributed across more than one package.

In some embodiments, the SPU may comprise one or more motion sensors. For example, an embodiment with an accelerometer, and a gyroscope, which each provide a measurement along three axes that are orthogonal relative to each other, may be referred to as a 6-axis device. In another embodiment with an accelerometer, a gyroscope, and a magnetometer or other compass technology, which each provide a measurement along three axes that are orthogonal relative to each other, may be referred to as a 9-axis device. Other embodiments may, for example, comprise an accelerometer, gyroscope, compass (e.g., a magnetometer), and pressure sensor, and may be referred to as a 10-axis device. Along with one or more motion sensors, some embodiments of the SPU may include two or more microphones in an SPU which is either distributed across several packages or consolidated into a single package. Other embodiments may not include all the of these motion sensors or may provide measurements along one or more axes.

The term motion sensor is defined here as any type of sensor that may be used to determine the motion, orientation, and/or position or location of the device comprising the motion sensors. Motion sensors may also be used to determine the position or location of the device in which they are incorporated. For example, motion sensors may be used to determine a location or perform pedestrian navigation using so-called dead-reckoning techniques. Motion sensor(s) 450 may include one or some combination of sensor selected from a group that includes, but is not limited to: gyroscopes 451, accelerometers 453, magnetometers 455, pressure sensors 457, and ultrasonic sensors 459. In some embodiments, an accelerometer 453 may be used to determine the orientation with respect to gravity, while a magnetometer 455 may be used to determine the orientation with respect to the earth's magnetic field. In some embodiments, a gyroscope 451 may be used to determine the orientation and/or changes in orientation. In some embodiments, a pressure sensor 457 may be used to determine a change in vertical position, and as such may be used as a motion sensor. In some embodiments, an ultrasound sensor may be used to determine distance, location, or change in distance/location, and as such may be used as a motion sensor. When it comes to location, the magnetometer 455 may also be used by measuring the magnetic characteristic of different locations and creating a map of these magnetic characteristics, which is also referred to a magnetic fingerprinting. Once a map of the magnetic characteristics is available, in any desired number of dimensions, the location of the device can be determined by comparing the measured magnetic characteristics to the mapped magnetic characteristics.

The term calibration is defined as any procedure, method, or process to verify and make sure that the motion sensor can function properly to determine the motion, orientation, and/or position or location of the device comprising the motion sensors, as discussed above. For example, this may include removing or inserting of bias or offset, correcting for any cross-axes effect, and adjusting sensitivity. Furthermore, when it comes to determining the location with the motion sensors, calibration may include inciting a motion to cause the user to move the user interface to a particular location in space. The location may be a location relative to the user, for example, in the immediate vicinity of the user. For example, the user may be incited to move a handheld device to a certain location in space with respect to the (body of) the user. That particular location may be of interest because the sensor signals measured at that location are used in the calibration of the sensor, or in the correct functioning of the device at a later time. The location may be a home or reference location from which further motions for calibration may be incited. The location may be taken from or associated with a stored map. The map may be a geographical map, or a signal map representing the expected sensor signals for certain locations (e.g., a map of expected magnetic signals that forms a magnetic fingerprint). The stored map may be composed of position information taken from any of the motion sensors, from satellite navigation signals, and/or a combination thereof.

The sensors may, for example, be formed on a first substrate. Various embodiments may, for example, include solid-state sensors and/or any other type of sensors. The electronic circuits in the SPU may, for example, receive measurement outputs from the one or more sensors. In various embodiments, the electronic circuits process the sensor data. The electronic circuits may, for example, be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package, such as a single integrated circuit.

In an example embodiment, the first substrate is attached to the second substrate through wafer bonding, as described in commonly owned U.S. Pat. No. 7,104,129, to simultaneously provide electrical connections and hermetically seal the MEMS devices. This fabrication technique advantageously enables technology that allows for the design and manufacture of high performance, multi-axis, inertial sensors in a very small and economic package. Integration at the wafer-level minimizes parasitic capacitances, allowing for improved signal-to-noise relative to a discrete solution. Such integration at the wafer-level also enables the incorporation of a rich feature set which minimizes the need for external amplification.

Example Electronic System

Turning to the figures, FIG. 1 shows a block diagram of an electronic system 100 which includes an electronic device 101, a user interface 102, and a display 103, in accordance with various aspects of the present disclosure. All or portions of electronic system 100 may be mobile (human carriable, handholdable, or wearable) or fixed. In some embodiments, all of electronic device 101, user interface 102, and display 103 are co-located in a single chassis/housing. In some embodiments, some or all of electronic device 101, user interface 102, and display 103 are separated physically from one another and communicatively coupled to one or more others of the components by wired and/or wireless communication. In some embodiments, some portion of electronic system 100 may include or utilize cloud-based computing resources such as cloud-based processing, memory, and/or storage.

Example Electronic Device

Figure 2:
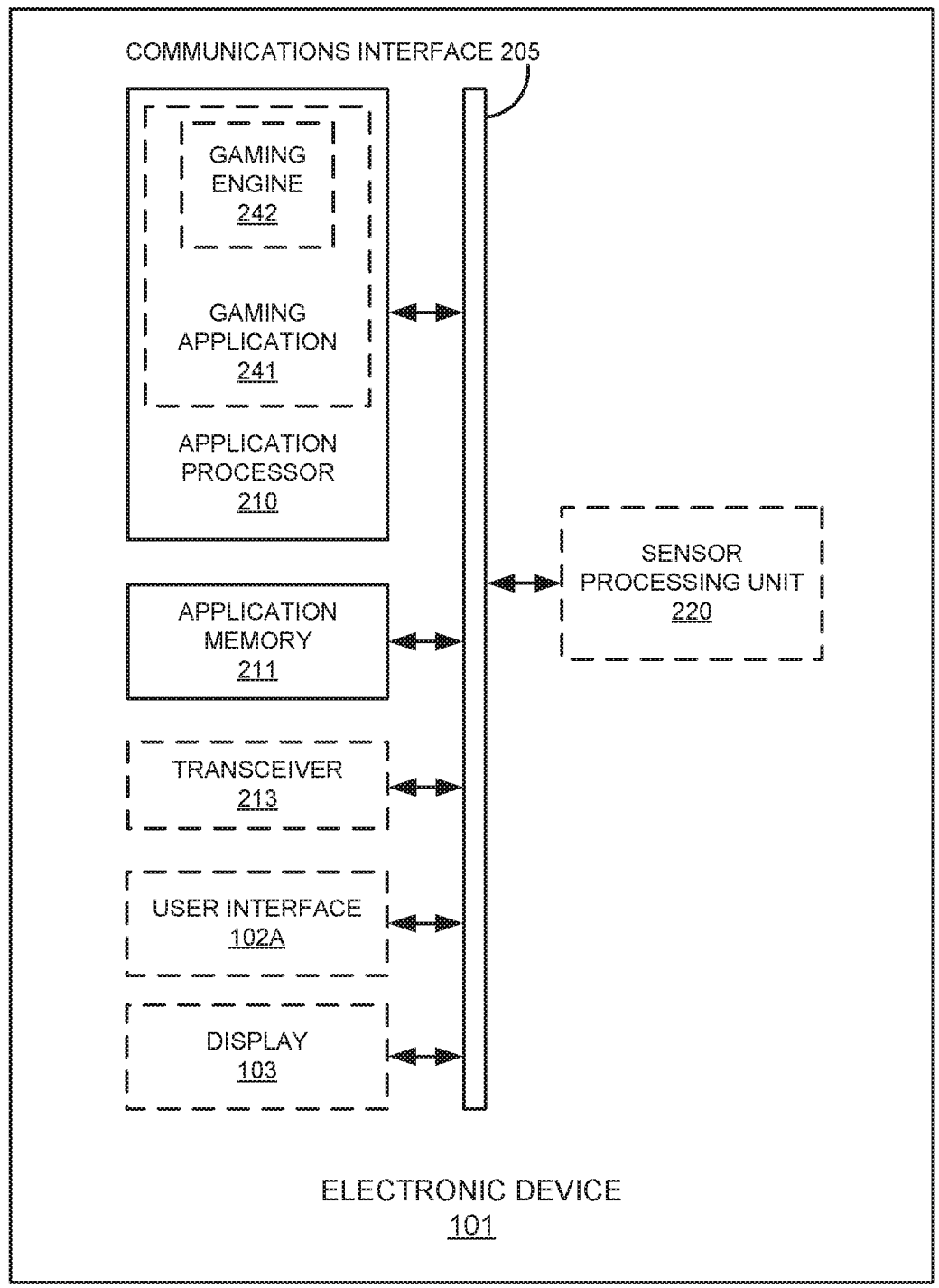
FIG. 2 shows a block diagram of an example electronic device, which may be a mobile electronic device and may be included as a portion of the electronic system depicted in FIG. 1, in accordance with various aspects of the present disclosure.

FIG. 2 shows a block diagram of an example electronic device 101, which may be a mobile electronic device and/or may be included as a portion of the electronic system 100 depicted in FIG. 1, in accordance with various aspects of the present disclosure.

As will be appreciated, electronic device 101 may be implemented as a mobile electronic device or apparatus. By mobile, what is meant is that the electronic device is a handheld/hand-holdable and/or user-wearable device (e.g., a watch, a headband, a pendant, an armband, a belt-mounted device, eyeglasses, a fitness device, a health monitoring device, etc.) that can be held in the hand of a user and/or worn on the person. For example, such a mobile electronic device 101 may without limitation be: a mobile phone (e.g., a cellular phone, a phone running on a local network, or any other telephone handset), wired telephone (e.g., a phone attached by a wire and/or optical tether), personal digital assistant (PDA), pedometer, personal activity and/or health monitoring device, video game player, video game controller, user interface, navigation device, mobile internet device (MID), personal navigation device (PND), digital still camera, digital video camera, a tablet computer, a head mounted display (HMD), an augmented reality/virtual reality display, a notebook computer, binoculars, telephoto lens, portable music player, portable video player, portable media player, portable multi-media communications device, remote control, handheld (AR/VR) controller, a wristwatch, a mobile interne of things (TOT) device, or a combination of one or more of these devices.

In some embodiments, electronic device 101 may be a self-contained device that comprises its own display and/or other output devices in addition to input devices as described below. However, in other embodiments, electronic device 101 may function in conjunction with another portable device or a non-portable device or overall electronic system, such as a desktop computer, electronic tabletop device, server computer, etc., which can communicate with electronic device 101, e.g., via network connections. Electronic device 101 may, for example, communicate via a wired connection using any type of wire-based communication protocol (e.g., serial transmissions, parallel transmissions, packet-based data communications), wireless connection (e.g., electromagnetic radiation, infrared radiation, or other wireless technology), or a combination of one or more wired connections and one or more wireless connections.

As shown, example electronic device 101 comprises a communications interface 205, an application (or host) processor 210, application (or host) memory 211. In FIG. 2, components showed in broken line (i.e., dashed boxes) may not be included in some embodiments. Accordingly, in some embodiments, electronic device 101 may additionally include one or some combination of: user interface 102, transceiver 213, display 103, and sensor processing unit 220. As depicted in FIG. 1, included components are communicatively coupled with one another, such as, via communications interface 205.

The application processor 210 (which may also be referred to as "host processor" 210) may, for example, be configured to perform the various computations and operations involved with the general function of electronic device 101 (e.g., running applications, performing operating system functions, performing power management functionality, controlling user interface functionality for electronic device 101, etc.). One example of an application supported by the technology described herein is a game, however the technology described herein is applicable to other applications besides games. Application processor 210 can be one or more microprocessors, central processing units (CPUs), DSPs, GPUs, general purpose microprocessors, ASICs, ASIPs, FPGAs or other processors which run software programs or applications associated with the functions and capabilities of electronic device 101. These software programs or applications may be stored in and/or utilize application memory 211. In some embodiments, application processor 210 can be formed of or include one or more cloud-based processors.

Communications interface 205 may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent.

The application memory 211 (for example, a host memory) may comprise programs, drivers or other data that utilize information provided by the application processor and/or by the sensor processing unit 220 (when included). Details regarding some example suitable configurations of the application (or host) processor 210 and SPU 220 may be found in commonly owned U.S. patent application Ser. No. 12/106,921, filed Apr. 21, 2008. Application memory 211 can be any suitable type of memory, including but not limited to electronic memory (e.g., read only memory (ROM), random-access memory (RAM), or other electronic memory), hard disk, optical disk, or some combination thereof. Multiple layers of software can be stored in application memory 211 for use with/operation upon application processor 210. In some embodiments, a portion of application memory 211 may be utilized as a buffer for data from one or more of the components of electronic device 101. In some embodiments, application memory 211 can be formed of or include cloud-based memory.

Transceiver 213, when included, may be one or more of a wired or wireless transceiver which facilitates receipt of data at electronic device 101 from an external transmission source and transmission of data from electronic device 101 to an external recipient. By way of example, and not of limitation, in various embodiments, transceiver 213 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), a wired a serial transceiver (e.g., a universal serial bus for wired communication), or other wired or wireless communicative coupling.

User interface 102A, when included, may be any of a variety of different devices or a combination thereof that provide input and/or output to a user, such as audio speakers, touch screen, real or virtual buttons, joystick, slider, knob, printer, scanner, computer network I/O device, motion sensitive direction input, other connected peripherals and the like.

Display 103, when included, may be any device which can display graphic images and/or alphanumeric characters recognizable to a user. By way of example and not of limitation, display 103 may comprise a liquid crystal device, (organic) light emitting diode device, or other display suitable for creating and visibly depicting graphic images and/or alphanumeric characters recognizable to a user. Display 103 may be configured to output images viewable by the user and may additionally or alternatively function as a viewfinder for a camera unit (when included) of electronic device 101.

SPU 220, when included, operates to control and interface between application processor 210 (and other components of electronic device 101) and sensors that are coupled with or disposed as a portion of sensor processing unit 220. The sensors include one or more motion sensors 450 and may include other sensors in addition to the motion sensors. Such motion sensors output motion data indicative of user movements of electronic device 101 and/or user interface 102A. In addition to internal sensors, SPU 220 operates to interface with and/or control sensors that are located external to SPU 220. In some embodiments, some or all of the functions of sensor processing unit 220 may be performed by other processors, such as e.g., application processor 210.

In some embodiments, multiple different applications can be provided on a single electronic device 101, and in some of those embodiments, multiple applications can run simultaneously on electronic device 101. Multiple layers of software can, for example, be provided on a computer readable medium such as electronic memory or other storage medium such as hard disk, optical disk, flash drive, etc., for use with application processor 210 and sensor processor 430. For example, an operating system layer can be provided for electronic device 101 to control and manage system resources in real time, enable functions of application software and other layers, and interface application programs with other software and functions of electronic device 101. In various example embodiments, one or more motion algorithm layers may provide one or more of: calibration of motion sensors; motion algorithms for lower-level processing of raw sensor data provided from internal or external sensors; and the like. Further, a sensor device driver layer may provide a software interface to the hardware sensors of electronic device 101. Some or all of these layers can be provided in the application memory 211 for access by the application processor 210 or for access by the sensor processing unit or other portion of electronic device 101.

Gaming application 241 is one example of an application which may operate on application processor 210 and be stored in/and/or rely upon application memory 211. It should be appreciated that in some embodiments, gaming application 241 may be implemented by a remote processor, such as by a cloud-based processor/computer system, where the terms "cloud" and "cloud-based" refer to using shared computing resources that are remotely located rather than having local servers or personal devices to handle applications. For example, the cloud-based computing resources are communicatively coupled to local entities, such as electronic device 101, user interface 102, and or display 103. In such a case, all, or some portion of application processor 210 and/or application memory 211 may be part of a computing system that is, cloud-based.

Gaming engine 242 is another example of an application which may operate on application processor 210 and be stored in and/or rely upon application memory 211. Although, gaming engine 242 is depicted as being a portion of gaming application 241, in some embodiments, these applications may be separate applications. It should be appreciated that in some embodiments, gaming engine 242 may be implemented upon a remote processor, such as by a cloud-based processor/computer system.

In some embodiments, gaming engine 242 includes the main algorithm for a game that generates game play and game content (such as the movements and action of the gaming characters) based upon inputs received from a user interface (such as user interface 102) and typically includes applications/logic for rendering image graphics for output to a user (e.g., on display 103) and rendering sound for output to a user. In some embodiments, the main program of a game may operate on application processor 210 as a separate gaming application 241 that interacts with gaming engine 242. As will be described herein, in some embodiments, gaming engine 242, gaming application 241, or a portion thereof operates to generate content which incites a user to move a user interface 102 of other device containing sensors in a direction or pattern of directions needed for calibration of one or more motion sensors, without explicitly requesting the user to do so.

Figure 3:
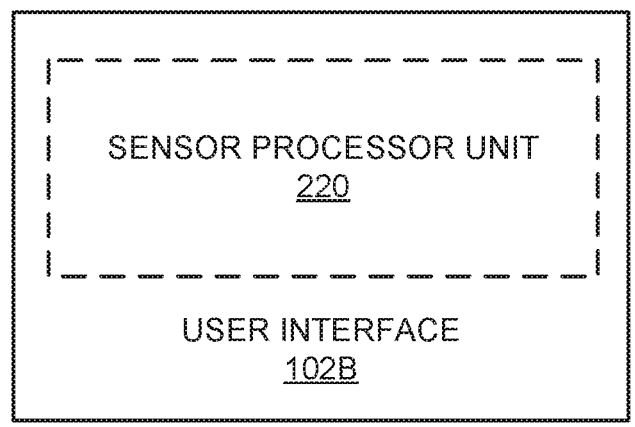
FIG. 3 shows a block diagram of an example user interface, which may be communicatively coupled with or included as a portion an electronic device of FIG. 2 and/or an electronic system of FIG. 1, in accordance with various aspects of the present disclosure.

FIG. 3 shows a block diagram of an example user interface 102B, which may be communicatively coupled with or included as a portion an electronic device of FIG. 2 and/or an electronic system of FIG. 1, in accordance with various aspects of the present disclosure. Like user interface 102A, user interface 102B may be any of a variety of different devices or a combination thereof that provide input and/or output to a user, such as audio speakers, touch screen, real or virtual buttons, joystick, slider, knob, printer, scanner, computer network I/O device, motion sensitive direction input, remote control, AR/VR controller, other connected peripherals and the like. The difference between user interface 102A and user interface 102B is that user interface 102A is disposed as a portion of electronic device 101, whereas user interface 102B is standalone and physically separate from electronic device 101 (though it may communicatively coupled with electronic device 101). As shown by broken-line, in some embodiments, user interface 102B includes a sensor processing unit 220 which may include motion sensors that output motion data indicative of user movements of user interface 102B. As a non-limiting example, in some embodiments, electronic device 101 may comprise a head mounted device (HMD) for virtual reality gaming while user interface 102B comprises a hand-held virtual reality controller that is used in conjunction with the head mounted device for the virtual reality gaming.

Figure 4:
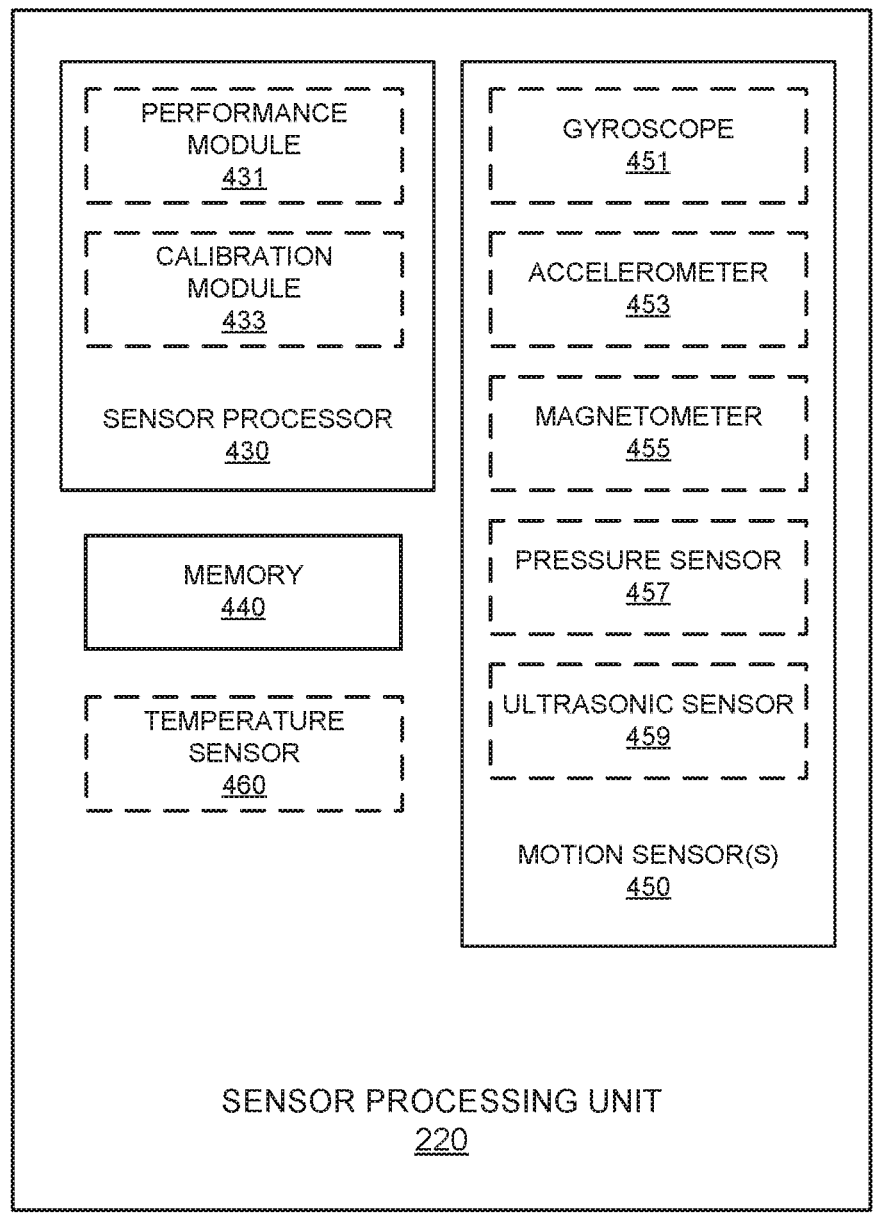
FIG. 4 shows a block diagram of an example sensor processing unit, in accordance with various aspects of the present disclosure.

FIG. 4 shows a block diagram of an example sensor processing unit 220, in accordance with various aspects of the present disclosure. SPU 220 comprises: a sensor processor 430; internal memory 440; and one or more sensors. With respect to SPU 220, components showed in broken line (i.e., dashed boxes) may not be included in some embodiments. Accordingly, in some embodiments, electronic device 101 may additionally include one or some combination of: motion sensors 450 (e.g., gyroscope 451, accelerometer 453, a magnetometer 455, and/or other motion sensors such as a pressure sensor 457 and/or an ultrasonic sensor 459); temperature sensor 460; and/or other sensors (e.g., a biometric sensor). In various embodiments, SPU 220 or a portion thereof, such as sensor processor 430, is communicatively coupled with application processor 210, application memory 211, and other components of electronic device 101 through communications interface 205 or other well-known means. SPU 220 may also comprise a communications interface (not shown) similar to communications interface 205 and used for communications among one or more components within SPU 220.

Sensor processor 430 can be one or more microprocessors, CPUs, DSPs, GPUs, general purpose microprocessors, ASICs, ASIPs, FPGAs or other processors that run software programs, which may be stored in memory such as internal memory 440 (or elsewhere), associated with the functions of sensor processing unit (SPU) 220. Sensor processor 430 operates to control and configure included sensors such as motion sensor(s) 450 and/or temperature sensor 460. Sensor processor 430 may also run software programs for electronic device 101, user interface 102, display 103, and/or for other applications related to the functionality of an electronic system 100. For example, different software application programs such as menu/application navigation software, games, camera function control, navigation software, and phone or a wide variety of other software and functional interfaces can be provided. In some embodiments, sensor processor 430 includes one or more of a performance module 431 and a calibration module 433. These modules, when included, may be implemented in logic or in firmware, software, or a combination thereof that executes instructions upon sensor processor 430. When not included, sensor processor 430, may simply perform the functions described herein with respect to performance module 431 and calibration module 433. It should be appreciated that in some embodiments, the functions described as being performed by sensor processor 430 may also or alternatively be performed by application processor 210 or another communicatively coupled processor.

Performance module 431 may operate to monitor and/or set the performance specifications of the various sensors. For example, sensor processor 430 or a portion thereof, such as performance module 431, may set the output data rate and full-scale data rate for gyroscope 451, accelerometer 453, and/or magnetometer 455. Performance module 431 may also monitor the performance of sensors that are internal and external to SPU 220 to make sure that the sensors are performing as required or as specified.

Calibration module 433 may operate to coordinate and perform calibration of a sensor. Calibration module 433 may detect the need for calibration and perform the calibration. If the calibration requires a certain motion, calibration module 433 may opportunistically wait for that motion to occur, and then perform the required calibration. In some embodiment, the calibration procedure may comprise calibration module 433 sending a signal or message to an entity outside of SPU 220 (e.g., to gaming engine 242) to indicate that calibration is needed, what type of calibration is needed, and/or what motions need to be incited to conduct calibration. Calibration module 433 may also operate to receive feedback, a response, instructions, and/or timing information about game content generated to incite motions from an entity outside of SPU 220 (e.g., from gaming engine 242). In some embodiments, sensor processor 430 or a portion thereof, such as performance module 431 and/or calibration module 433, determines when a sensor needs calibration, such as by: measuring elapsed time from a previous calibration; noting a "calibrate me" calibration signal sent to sensor processor 430 from a sensor; receiving an external signal (such as from an application processor 210) to calibrate a sensor, etc. When calibration is due, sensor processor 430, or a portion thereof such as calibration module 433, may send a signal to one or more sensors to place the sensor(s) in a calibration mode and may also signal the sensor(s) about a window of time when a calibration motion/pattern of motion is expected to be incited and thus occur. It should be appreciated that in some embodiments, some, or all functions of performance module 431 and/or calibration module 433 may be carried out by application processor 210 or by any processor disposed within electronic system 100.

In an example where a game is played, and content is generated for display by and interaction via a head mounted display, an application processor 210 runs the gaming application 241 and the gaming engine 242, and the sensor processing unit 220 is disposed as a portion of the head mounted display (e.g., as a portion of HMD 502). The internal sensors of SPU 220 are motion sensors 450, such as gyroscope 451, accelerometer 453, and/or magnetometer 455, and may also include other sensors such as pressure sensor 457 and/or ultrasonic sensor 459. Performance module 431 of SPU 220 may monitor the performance of motion sensors 450 and may indicate when the performance is below a predefined threshold which indicates calibration is needed. In some embodiments, performance module 431 may compare the sensor values to one or more normative values to determine if the sensors are performing adequately. For example, accelerometer data and magnetometer data may be compared to the (average) expected value of gravity and the magnetic field, respectively. In some embodiments, performance module 431 may compare data from different sensors to verify if their data is consistent. For example, accelerometer data and gyroscope data may be compared to verify both data indicate similar motion. If this is not the case, one or both sensors may need calibration. Data from different combinations of sensors may be compared to verify if their data is consistent. For example, an orientation of the device (e.g., electronic device 101, user interface 102B) as determined by a data fusion between an accelerometer 453 and a gyroscope 451 may be compared to an orientation of the device as determined by a data fusion between a magnetometer and a gyroscope. A difference between the two determined orientations may be an indication of performance (problems). The performance of the sensors may also be determined in an indirect way. For example, the time since the last calibration motion is a good indicator as a performance index. In another example, the temperature change since the last calibration motion may also be used as an indicator as a performance index. In yet another example, excessive motion, accelerations, shock, or their recurrence or number of occurrences may also be used as an indirect performance indicator. The application (a gaming application 241 in this example running on or in conjunction with gaming engine 242) may also indicate a required performance level (to performance module 431), which may be constant during the whole execution of the application, or which may vary during execution of the application. Performance module 431 may indicate if the motion sensors 450 are performing as required and give a binary result (performing as required, or not) that is provided as an output to the application (e.g., to one or more of gaming application 241 and gaming engine 242 in this case) and/or to calibration module 433. Additionally, or alternatively, performance module 431 may output different performance levels e.g., on a multi-level scale which may be provided to the application and/or to calibration module 433. When the output from performance module 431 indicates a performance below the required performance level, calibration module 433 may determine what type of calibration is needed. Calibration module 433 may then communicate the desired action to the application running on application processor 210. In the above example, calibration module 433 may communicate a desired user motion to the application (e.g., to one or more of gaming application 241 and gaming engine 242 in this case). The desired motion may be expressed for example as a motion direction (e.g., corresponding to an axis of a motion sensor), a motion vector in a stationary reference frame or a reference frame associated with the device, and may also contain an indication of magnitude of the motion. In more complicated calibration processes, the motion may be a motion pattern consisting of a plurality of motion vectors. An urgency or priority of the required calibration may also be communicated. Gaming application 241 and/or gaming engine 242 may give feedback to SPU 220, for example, to indicate timing of when the game is executing the action that should incite the user to perform the required motion, so that calibration module 433 can be ready to perform the calibration or to place the sensor(s) in the proper calibration mode if they are capable of self-calibration. The feedback to SPU 220 may also indicate whether or not it is possible to perform the requested motion, and with what accuracy, or under which conditions.

Internal memory 440 can be any suitable type of memory, including but not limited to electronic memory (e.g., read only memory (ROM), random-access memory (RAM), or other electronic memory). Internal memory 440 may store algorithms, routines, or other instructions for instructing sensor processor 430 on the processing of data output by one or more of the motion sensors 450. In some embodiments, internal memory 440 may store calibration instructions for one or more motion sensors 450. In some embodiments, memory 440 may store instructions for implementing one or both of performance module 431 and calibration module 433.

Motion sensors 450, when included, may be implemented as MEMS-based motion sensors, including inertial sensors such as a gyroscope 451, or accelerometer 453, or an electromagnetic sensor such as a Hall effect or Lorentz field magnetometer 455 (or some combination thereof). Other inertial sensors, such as an inclinometer may also be included. A pressure sensor 457 may also be included and used as a (vertical) motion sensor. In some embodiments, at least a portion of the motion sensors 450 may also, for example, be based on sensor technology other than MEMS technology (e.g., CMOS technology, etc.). One or more of the motion sensors 450 may be configured to provide raw data output measured along three orthogonal axes or any equivalent structure. Motion sensor(s) 450 are communicatively coupled with sensor processor 430 by a communications interface, bus, or other well-known communication means. When a mobile version of electronic device 101 includes one or more motion sensors 450 and is carried and/or worn on the person of the user, the motion and/or orientation in space of the electronic device 101 are sensed by the motion sensor(s) 450 when the electronic device 101 is moved in space by the user or the movements of the user. Similarly, when a user interface 102 includes one or more motion sensors 450 and is carried and/or worn on the person of the user, the motion and/or orientation in space of the user interface 102 are sensed by the motion sensor(s) 450 when the user interface 102 is moved in space by the user or the movements of the user. In some embodiments, one of more of motion sensors 450 include a calibration mode that can be initiated by sensor processor 430. In some embodiments, one or more of motion sensors 450 can determine when an out-of-calibration state exists and is/are configured to send a signal to sensor processor 430 or elsewhere to request calibration. The sensor may also send the calibration signal for other reasons other than an out of calibration state, such as surpassing a threshold of cycles or time since last calibration. This signal is referred to herein as a "calibrate me" signal or a "calibration signal," and identifies a need for calibration of the sensor which sends it. In some embodiments, sensors that do not have the ability to self-determine when calibration is needed are monitored by sensor processor 430, performance module 431, calibration module 433, and/or another external entity to determine when calibration is required.

As discussed herein, various aspects of this disclosure may, for example, comprise processing various sensor signals indicative of device motion and/or orientation. These signals are generally referred to as "motion data" herein. Non-limiting examples of such motion data are signals that indicate accelerometer, gyroscope, and/or magnetometer data in a coordinate system. The motion data may refer to the processed or non-processed data from the motion sensor(s). In an example implementation, data from an accelerometer, gyroscope, and/or magnetometer may be combined in a so-called data fusion process, performed, for example, by sensor processor 430, in order to output motion data in the form of a vector indicative of device orientation and/or indicative of a direction of device motion. Such a vector may, for example, initially be expressed in a body (or device) coordinate system. Such a vector may be processed by a transformation function that transforms the orientation vector to a world coordinate system. The motion and/or orientation data may be represented in any suitable reference frame, and may be represented in any suitable form, such as for example, but not limited to, quaternions, orientation matrices, Euler angles, and any of a variety of coordinate systems (e.g., the Unity coordinate system).

In some embodiments, electronic device 101 and/or sensor processing unit 220 may include a temperature sensor 460 or other means for sensing and determining the operating temperature and/or changes in the operating temperature of electronic device 101 and/or sensor processing unit 220. In some embodiments, the motion sensor itself may comprise or be operable as a temperature sensor.

Figure 5:
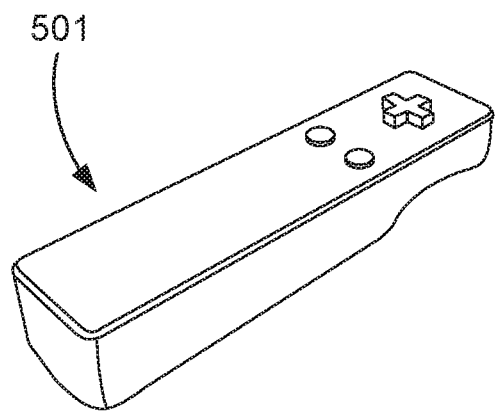
FIG. 5 depicts some non-limiting examples of physical embodiments which may comprise a user interface, and which may be communicatively coupled with or included as a portion an electronic device of FIG. 2 and/or an electronic system of FIG. 1, according to various aspects of the present disclosure.
Figure 5:
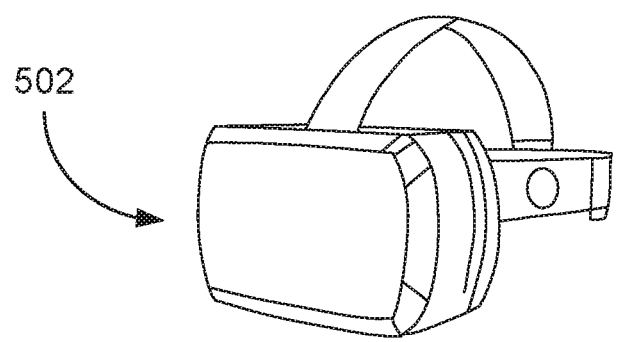
Figure 5:
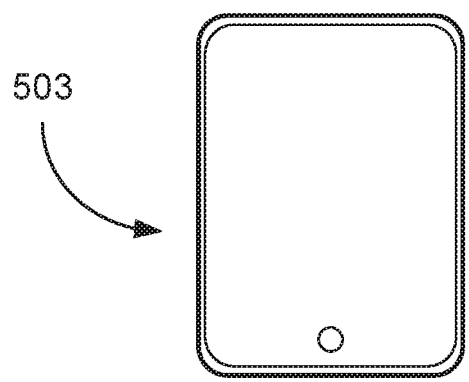

FIG. 5 depicts some non-limiting examples of physical embodiments which may comprise a user interface 102, and which may be communicatively coupled with or included as a portion an electronic device of FIG. 2 and/or an electronic system of FIG. 1, according to various aspects of the present disclosure. In some embodiments, user interface 102 may be embodied in a handheld/hand-holdable controller such as game controller 501. In some embodiments, user interface 102 may be embodied within a user-wearable device such as head mounted display (HMD) 502 which is used for AR/VR content presentation and user interaction (e.g., head motion and/or orientation) and/or a smart wristwatch. In some embodiments, user interface 102 may be embodied within a handheld/hand-holdable tablet, telephone, or phablet such as multi-media communication device 503. It should be appreciated, that in some embodiments, multi-media communication device 503 and/or head mounted display 502 may embody a display and a user interface and thus include two or more of the three portions (101, 102, 103) of electronic system 100 depicted in FIG. 1.

Figure 6:
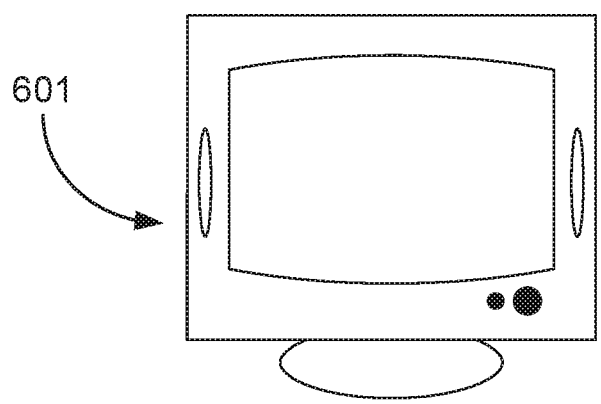
FIG. 6 depicts some non-limiting examples of physical embodiments which may comprise a display, and which may be communicatively coupled with or included as a portion an electronic device of FIG. 2 and/or an electronic system of FIG. 1, according to various aspects of the present disclosure.
Figure 6:
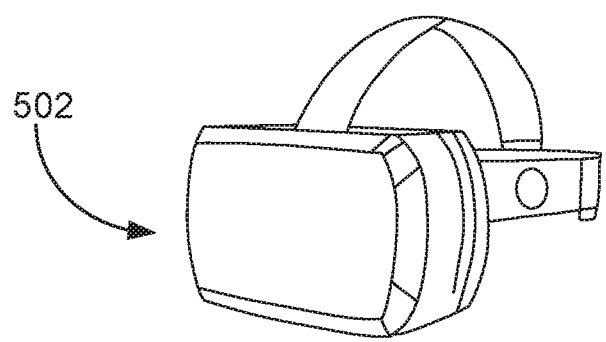
Figure 6:
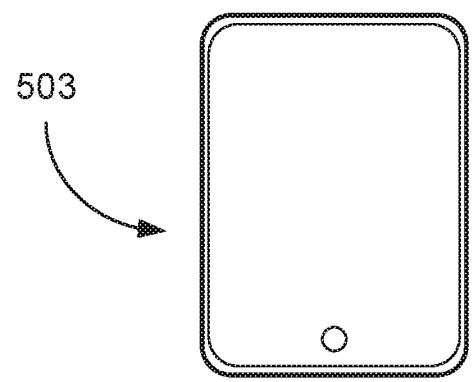

FIG. 6 depicts some non-limiting examples of physical embodiments which may comprise a display 103, and which may be communicatively coupled with or included as a portion an electronic device of FIG. 2 and/or an electronic system of FIG. 1, according to various aspects of the present disclosure. In some embodiments, display 103 may be embodied in a device such as display monitor 601. In some embodiments, display 103 may be embodied within a user-wearable device such as head mounted display 502 which is used for AR/VR content presentation. In some embodiments, user interface 102 may be embodied within a handheld/hand-holdable tablet, smart cellular telephone, or phablet such as multi-media communication device 503.

Figure 7:
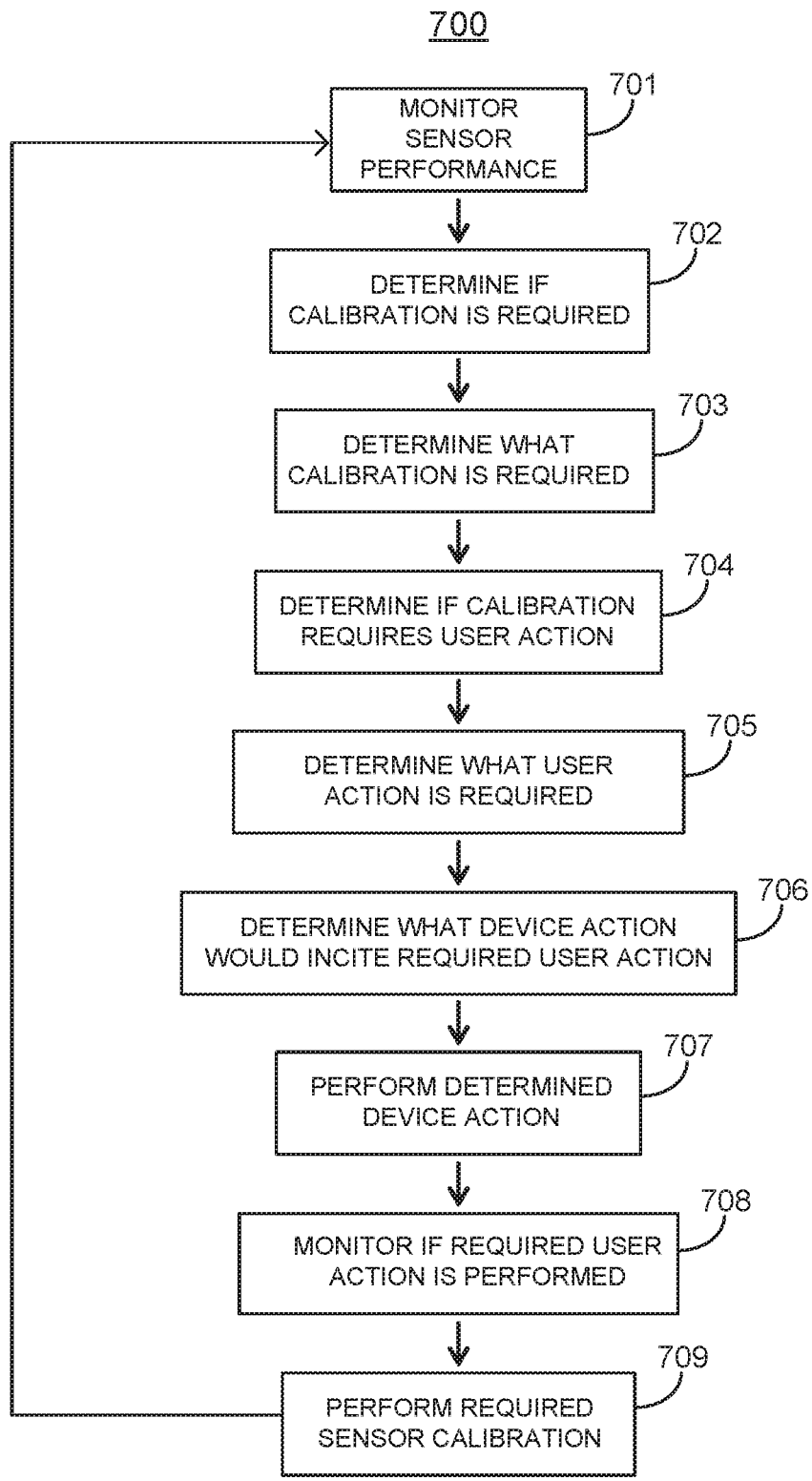
FIG. 7 illustrates a flow diagram of an example method of inciting user action for sensor calibration, in accordance with various aspects of the present disclosure.

FIG. 7 illustrates a flow diagram 700 of an example method of inciting user action for sensor calibration, in accordance with various aspects of the present disclosure. It is appreciated that in some embodiments, the procedures may be performed in a different order than described, that some of the described procedures may not be performed, and/or that one or more additional procedures to those described may be performed. Flow diagram 700 includes some procedures that, in various embodiments, are carried out by one or more processors (e.g., sensor processor 430, application processor 210, or the like) under the control of computer-readable and computer-executable instructions that are stored on non-transitory computer-readable storage media (e.g., application memory 211, internal memory 440, or the like). It is further appreciated that one or more procedures described in flow diagram 700 may be implemented in hardware, or a combination of hardware with firmware and/or software.

At 701, a monitoring entity monitors the performance of a sensor or sensors. The monitoring entity may be one or some combination of an electronic system 100, electronic device 101, and a sensor processing unit 220; and the monitoring entity may additionally or alternatively comprise one or more applications (e.g., gaming application 241, gaming engine 242, performance module 431, and/or calibration module 433). The monitoring entity may be different for different procedures in method illustrated in flow diagram 700. The sensor(s) may be one or more of motion sensors 450, and/or other types of sensors.

At 702, based on the monitored performance the monitoring entity determines if calibration of the monitored sensor(s) needs to be performed.

At 703, if it is observed/determined that calibration is required, the monitoring entity determines what calibration(s) is/are required.

At 704 the monitoring entity determines if the required calibration(s) require a user action (e.g., a movement).

At 705, when the required calibration requires a user action, the monitoring entity determines which user action is required.

At 706 the monitoring entity determines what action of the "object" in which the sensor(s) requiring calibration is/are disposed would incite the user to react with the required action. For purposes of this example the "object" can be presumed to be an electronic device, but in other embodiments the object may be a user interface, a display, or some other object. The action may be an audio output, a visual output (e.g., something displayed), a vibration, or some combination of these or device actions. The action(s) is generated and provided as content for the electronic device (or other object).

At 707 the electronic device (or other object) in which the sensor(s) requiring calibration is/are disposed performs the determined action. The action may be performed at the direction of the monitoring entity or by a component in coordination with the monitoring entity. For example, the electronic device may display the content for user viewing and reaction via a user interface 102.

At 708, the monitoring entity determines if the user's reaction is the anticipated action, and thus whether the required user action has been performed.

At 709, responsive to determining that the required user action (e.g., a required movement) is performed, required sensor calibration is performed. The calibration of the sensor(s) may be directed by the monitoring entity and/or a component coordinating therewith. This may include directing the sensor(s) into a calibration mode, directing the sensor(s) on which calibration to perform, directing the sensor(s) on how to perform the calibration, and/or directing the sensor(s) on when to perform the calibration. This may also include simply performing the calibration upon the sensor. Once the sensor calibration is performed, the flow diagram loops back to 701 and resumes monitoring the sensor(s) performance.

An example application of the method described in flow diagram 700 is the calibration of one or more motion sensors 450 (such as gyroscopes 451, accelerometers 453, and/or magnetometers 455) in an HMD 502 used for gaming. The performance of the motion sensors in HMD 502 is monitored because poor performance could lead to the user of HMD 502 feeling sick (e.g., due to misoriented display of gaming content) and therefore having a bad user experience. To ensure a high performance, the motion sensors 450 are calibrated regularly to compensate for detrimental changes in drift, tilt, bias, sensitivity, and/or other measures of performance. In some embodiments, calibration may be performed if the temperature changes more than a certain amount of degrees, or e.g., the norm or mean of the sensor signal may be monitored to determine if calibration is needed. Calibration may also be performed at a certain time interval, or after a certain quantity of motion, or exceeding a motion threshold. Sensor calibration may be done for a single sensor, or the calibration may involve or require the use of an additional sensor. For example, calibration of accelerometer 453 or magnetometer 455 may be performed with the help of gyroscope 451. Therefore, calibration of one sensor may require also that another sensor is correctly calibrated first. As explained in relation to flow diagram 700, certain calibration(s) may require a certain action of the user.

In this example of calibrating the sensors disposed in HMD 502, the various axes of the accelerometer 453 and gyroscope 451 require a certain motion of the HMD 502 for calibration. For example, the user should look up and down (making a vertical rotational motion) and look left and right (making a horizontal rotation motion) to calibrate certain axes of gyroscope 451 and/or accelerometer 453. Thus, application content may be generated to incite a user to look up and down and to look left and right or make other motions to support calibration of sensors.

FIGS. 8A, 8B, 9A, 9B, 10A, and 10B illustrate various examples of game content displayed to incite a user action for motion sensor calibration, in accordance with various aspects of the present disclosure. The displayed game content in FIGS. 8A-12B is being displayed on a display 103. For purposes of example and not of limitation, it can be presumed that the display 103 is a portion of a head mounted display, such as HMD 502. The game content has been generated to facilitate calibration by inciting user motions needed for calibration of motion sensors 450. In this example, the game is a shooting game and the game content comprises game characters that the user is expected to "shoot" within the game. Gaming engine 242 can adapt the game development and generate game content based on a calibration request received from an entity that is monitoring motion sensors 450. This can include selecting and adapting a game character to be introduced at a particular location on a display and/or adapting a game character to move in a particular direction or pattern on a display to incite a desired user reaction (motion) via a user interface.

Figure 8A:
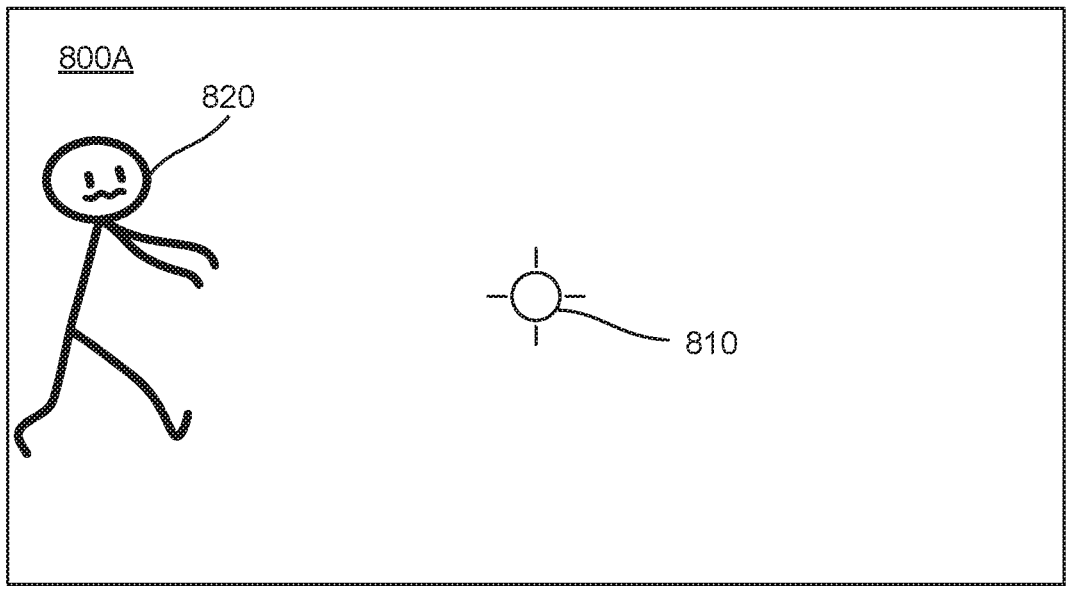
FIGS. 8A and 8B illustrate an example of game content displayed to incite a user action for motion sensor calibration, in accordance with various aspects of the present disclosure.
Figure 8B:
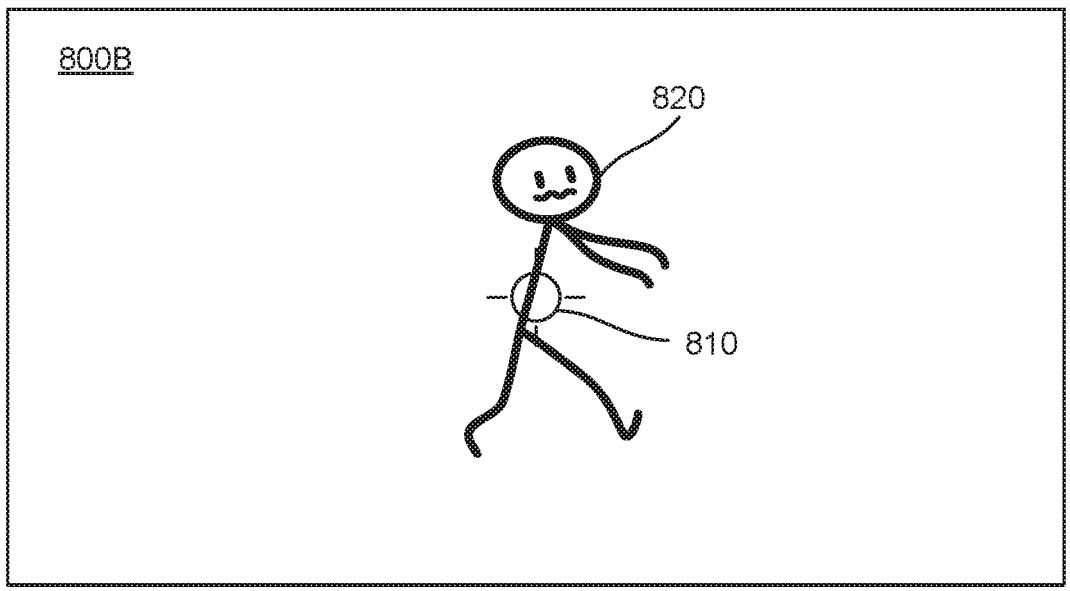

FIG. 8A shows game content 800A which comprises a zombie character 820 in the game and a gunsight reticle 810 which represents the aim point of the weapon of the user in the game. In this example, the user is required to move his head (and thus HMD 502) to position the gunsight reticle 810 which remains in the center of any displayed content. Based on the calibration and motion request received by gaming engine 242, the position of the zombie 820 has been adapted to begin on the left side of the displayed game content 800A and then walk from the left to the right. As a result of the action of the gaming engine 242 to make the zombie 820 move left to right, the anticipated reaction of the user is to be incited to move his head (rotationally) to the left to center the gunsight reticle 810 on the zombie 820 as shown in FIG. 8B by game content 800B, and then continue to track the zombie 820 to the right side of the display by turning his head from left to right to keep reticle 810 centered on zombie 820. Such incited movement enables system 100, electronic device 101, user interface 102, and/or SPU 220 to calibrate the motion sensors 450 on the corresponding motion axis or axes about which the user has moved his head, and thus moved the HMD 502 and its motion sensors 450.

It should be appreciated that the zombie 820 could similarly be made to start on the right side and move from right to left, or even appear at a location and remain motionless. Likewise, zombie 820 and/or different game characters can be positioned and caused to move in manners intended to incite additional movements from a user. Some examples of this are illustrated in FIGS. 9A, 9B, 10A, and 10B. The position and speed of movements of zombie 820 and/or other game characters may be adapted depending on the received motion request. The motion request, may also include a speed or timescale related to the requested motion and/or motion pattern.

In some embodiments, performance of motion sensors 450 is monitored over time and any degradation of calibration in the motion sensors 450 can be tracked so that it can be estimated or projected when degraded sensor calibration would be likely to negatively impact game play (i.e., a future time when calibration will be needed). This projection of a future calibration need allows an extended period of time for the motion request for calibration to be made without abruptly forcing the calibrating motion/motion pattern into the game play in an unnatural way that may detract from the gaming experience.

Figure 9A:
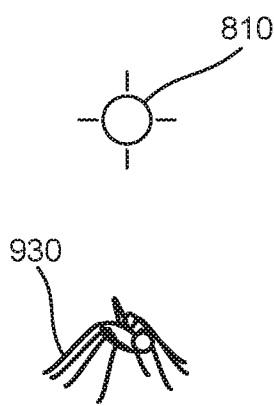
FIGS. 9A and 9B illustrate another example of game content displayed to incite a user action for motion sensor calibration, in accordance with various aspects of the present disclosure.
Figure 9B:
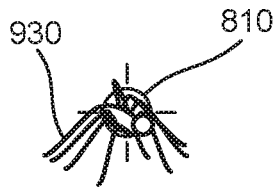

In FIG. 9A, gaming engine 242 has generated a spider character 930 that is positioned in the bottom center of the displayed game content 900A. When spider 930 remains motionless, the anticipated reaction of the user is to be incited to move his head vertically downward to center the gunsight reticle 810 on the spider 930 as shown in FIG. 9B by game content 900B. The gaming engine 242 may incite additional movement from the user by generating game content that causes spider 930 to move in any direction that it is desired to incite user motion by causing the user to move his head (and thus HMD 502) to keep reticle 810 centered on spider 930. Such incited movement enables system 100, electronic device 101, user interface 102, and/or SPU 220 to calibrate the motion sensors 450 on the corresponding motion axis or axes about which the user has moved his head, and thus moved the HMD 502 and its motion sensors 450.

Figure 10A:
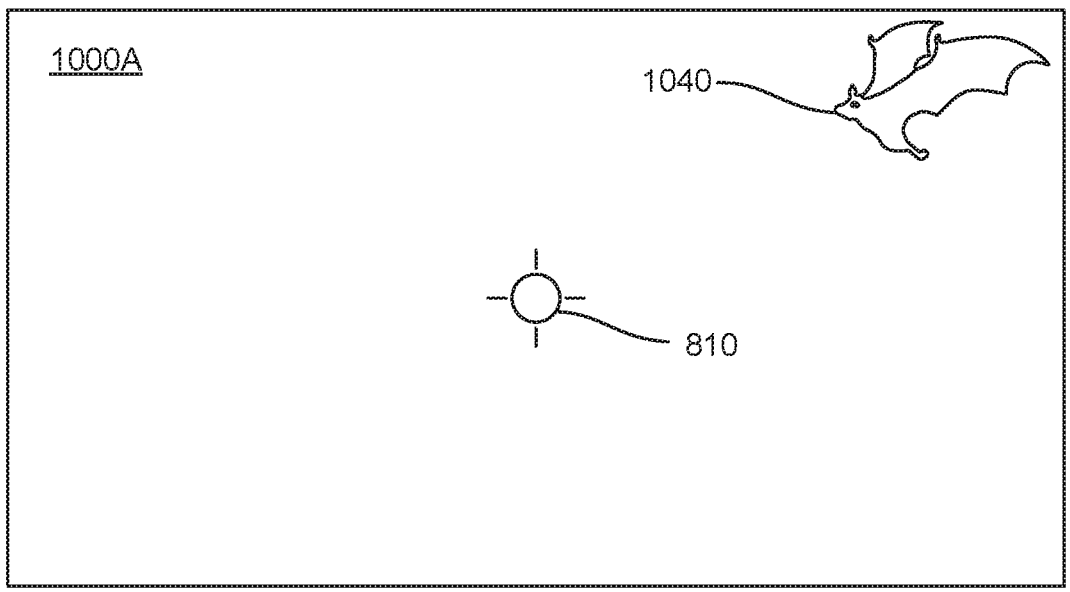
FIGS. 10A and 10B illustrate yet another example of game content displayed to incite a user action for motion sensor calibration, in accordance with various aspects of the present disclosure.
Figure 10B:
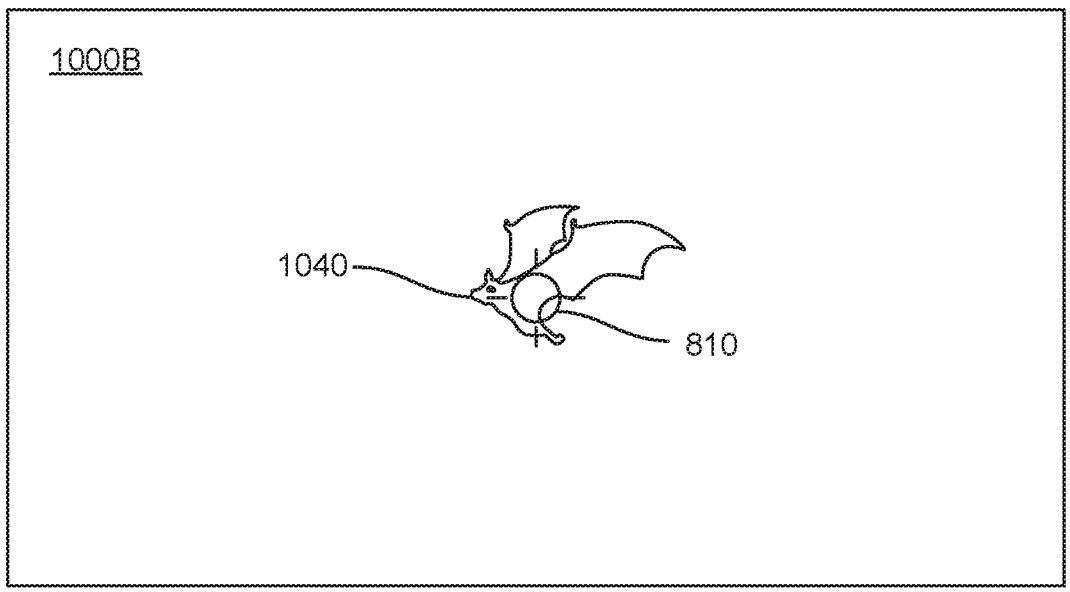

In FIG. 10A, gaming engine 242 has generated a bat character 1040 that is positioned in the top right of the displayed game content 1000A. When Bat 1040 remains motionless, the anticipated reaction of the user is to be incited to move his head diagonally upward to the right to center the gunsight reticle 810 on the bat 1040 as shown in FIG. 10B by game content 1000B. The gaming engine 242 may incite additional movement from the user by generating game content that causes bat 1040 to move in any direction that it is desired to incite user motion by causing the user to move his head (and thus HMD 502) to keep reticle 810 centered on bat 1040. For instance, game content may be generated that causes bat 1040 to move in a figure eight pattern so that the user is incited to move his head in a figure eight pattern to keep reticle 810 tracking on the center of bat 1040. Such incited movement enables system 100, electronic device 101, user interface 102, and/or SPU 220 to calibrate the motion sensors 450 on the corresponding motion axis or axes about which the user has moved his head, and thus moved the HMD 502 and its motion sensors 450.

It should be appreciated that a sequence of different game characters may be used in generated game content. To incite the user to perform a certain action with a certain amplitude, for example, gaming engine 242 may generate game content that first introduces a spider character 930 to incite the user to look down, and then introduces a bat character 1040 to incite the user to look up. In this case, the incited first action (looking down) is to get the user to the initial position for the calibration, and the incited second action (looking up) is to get the user to make the motion required for the calibration itself. The visual depictions of characters may be coupled with human audible audio cues as well. In some embodiments, the spatial location of the audible cue may be used alone or with a visible cue to incite a user to perform a motion such as turning a head mounted display or moving a game controller or other user interface in the direction in which the user perceives the sound of the audible cue. In some embodiments, an audible cue may be used to incite motion with a larger amplitude than allowed by the field of view of the display. For example, an audible noise on the right may be associated with a a game character that is to the right but outside the field of view of the display. By turning the head (and thus a head mounted display) to the right or moving a user interface to the right, the character will become visible on the display. In this manner coordination between audible and visual depictions allows greater amplitude of the incited motion.

The game content illustrated in FIGS. 8A-10B demonstrates the coordination between the calibration module 433 and the gaming engine 242 such that the game content is generated and develops in a certain specific way to incite user motions to facilitate the sensor calibration of motion sensors 450. In this coordination, the calibration module 433 outputs a signal that calibration is needed (to include what time of motions are needed, and the gaming engine 242 responds by adapted and generating game content based on the request from the calibration module 433. As part of the coordination, gaming engine 242 may provide one or more timing characteristics to calibration module 433 to indicate when generated game content will be introduced to the user. As part of the coordination, gaming engine 242 may also provide other feedback data, for example, whether the requested motion is possible or not, whether there would be an impact on the game, or with what accuracy the requested motion could be performed. The calibration module 433 may also indicate a priority or a time window for the calibration to take place. This allows the gaming engine 242 a flexible time period over which to incorporate the required actions without influencing the natural game play by abruptly incorporating motions to support calibrations.

The examples discussed in relation to FIGS. 8A-10B are focused on the use and the calibration of the motion sensors of a head mounted display, and on how to make the user perform head movements that allow for calibration. Similar procedures and processes may also be used to calibration motion sensors used in handheld devices, such as e.g., handheld controllers, which are often used in combination with head mounted displays (see FIGS. 5 and 6). In the case of handheld devices, the game play is adapted so that the user performs a required motion/action with the handheld device to enable calibration of the motion sensors in the handheld device. The game play used as an example in FIGS. 8A-10B, may similarly be applied to a handheld device, where in this case the use user may shoot the characters by pointing with the handheld controller. Character position and motion may then be adapted to incite the user the move the handheld controller in a certain way to enable calibration.

In situations where a HMD is used in combination with a handheld device, both the motion sensors in the HMD and in the handheld device may require calibration. In some embodiments, the system may then run parallel procedures and process for the different devices. In many situations, the reaction of a user to game play events may include both motion of the HMD and motion of the handheld controller. Therefore, in some embodiments, the system may determine game play that incites motion from more than one device, e.g., the user moving the HMD and the handheld controller, thus enabling the calibration of the motion sensors in the different devices. Any of the methods discussed below therefore apply to the calibration of sensors in one or more devices, simultaneously or sequentially.

Figure 11:
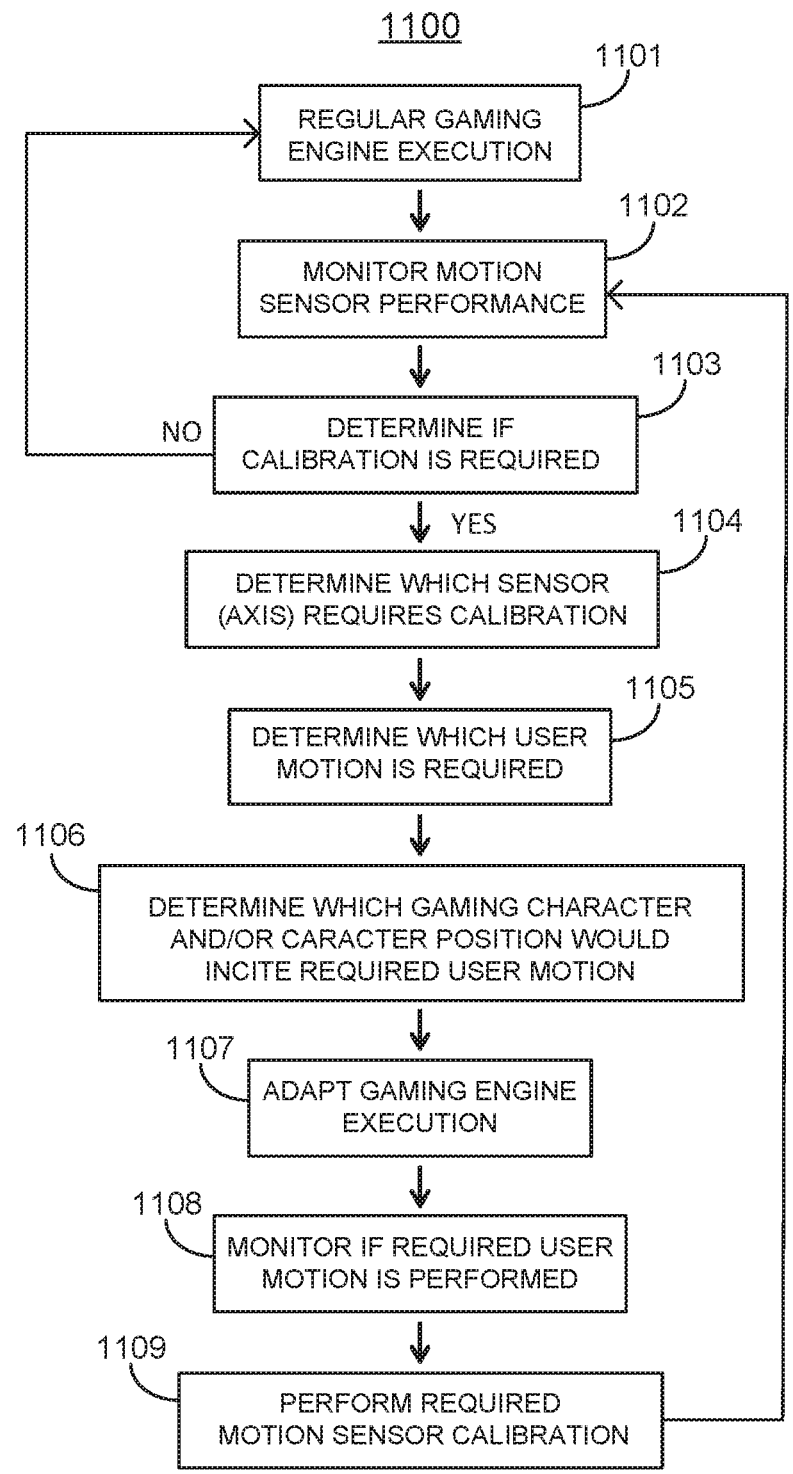
FIG. 11 illustrates a flow diagram of an example method of inciting user action through game play to perform motion sensor calibration, in accordance with various aspects of the present disclosure.

FIG. 11 illustrates a flow diagram 1100 of an example method of inciting user action through game play to perform motion sensor calibration, in accordance with various aspects of the present disclosure. The method illustrated in flow diagram 1100 is similar to the method illustrated by flow diagram 700 in FIG. 7 but is now adapted to the example of calibrating the motion sensors in an HMD, such as HMD 502. It is appreciated that in some embodiments, the procedures may be performed in a different order than described, that some of the described procedures may not be performed, and/or that one or more additional procedures to those described may be performed. Flow diagram 1100 includes some procedures that, in various embodiments, are carried out by one or more processors (e.g., sensor processor 430, application processor 210, or the like) under the control of computer-readable and computer-executable instructions that are stored on non-transitory computer-readable storage media (e.g., application memory 211, internal memory 440, or the like). It is further appreciated that one or more procedures described in flow diagram 1100 may be implemented in hardware, or a combination of hardware with firmware and/or software.

At 1101 a gaming engine, such as gaming engine 242 runs a gaming application. By way of example and not of limitation, the gaming application 241 may be a first-person shooter game that displays game content on an HMD, such as HMD 502.

At 1102, when running the gaming application, the gaming engine 242 will perform in a conventional manner, except that a portion of system 100 (e.g., a monitoring entity) will monitor the performance of the motion sensors 450 (e.g., one or more of gyroscope 451, accelerometer 453, and magnetometer 455) and coordinate with gaming engine 242. The monitoring entity may be one or some combination of electronic system 100, electronic device 101, and sensor processing unit 220; and the monitoring entity may additionally or alternatively comprise one or more applications (e.g., gaming application 241, gaming engine 242, performance module 431, and/or calibration module 433). In some embodiments, gaming engine 242 may receive and review the motion data from motion sensors 450 and perform some or all aspects of the monitoring. In other embodiments, some or all of the monitoring is performed external to gaming engine 242, such as by sensor processor 430, and coordination occurs between gaming engine 242 and the monitoring entity.

At 1103 as part of the monitoring of motion sensor performance it is determined if calibration is required. As previously discussed, numerous criteria may be monitored besides accuracy of output data from motion sensors 450 and may factor into whether calibration is needed for a particular sensor. When no calibration is required, the system will continue with the regular gaming engine execution as depicted at 1101.

At 1104, when calibration is required, the monitoring entity determines which sensor (accelerometer, gyroscope, and/or magnetometer) requires calibration and which axis or axes require calibration.

At 1105 when the required calibration requires a user action/motion, the monitoring entity or entities (e.g., electronic system 100, electronic device 101, or sensor processing unit 220) determines which user motion, if any, is required to assist with the calibration of the motion sensor(s) 450 in the HMD that requires calibration.

At 1106 it is determined, by gaming engine 242, which game evolution/events/modifications would incite the user to perform the required motion. These game events/modifications may comprise adaption of the game to introduce new gaming characters (along with their positioning and movement) and/or the modification of the position and/or movement of existing gaming characters. Some example characters, positions, and motions/motion patterns that might be implemented in a first-person shooter game were described in conjunction with FIGS. 8A through 10B. Of course, other characters, movements, and positioning may be introduced into game content to incite the desired motion/motion pattern from a user.

At 1107, once the required events and/or modification have been determined, the gaming engine execution is adapted to incite the motion. This includes gaming engine 242 adapting/modifying the gameplay of the game, while it is running, by generating the events/modifications as game content to be presented to the user via HMD 502. The adaptation may be done immediately, or gaming engine 242 may wait for the appropriate moment where the game can be adapted without influencing the game evolution too much. A maximum waiting time might be preset or may be determined based on the evolution of the sensor performance. In other words, the urgency of the adaptation of the gaming engine depends on the sensor performance, or change/degradation of sensor performance. For example, a longer waiting period may be allowed when a predetermined time-between-calibration threshold has been exceeded than when sensor drift, tilt, bias, or sensitivity has exceeded a predetermined threshold. As part of the adaptation, coordination may take place between gaming engine 242 and sensor processing unit 220 to exchange timing information regarding a specific time or a window of time when the user motion is expected to be incited, so that the motion sensors 450 may be readied to conduct calibration.

At 1108, during or after executing the required game changes, one or more portions of system 100 (e.g., application processor 210, gaming engine 242, user interface 102, and/or sensor processing unit 220) monitor to determine if the required user action (motion) has been performed.

At 1109, when the anticipated user motion being incited corresponds to the actual user motion that is performed, the system (typically sensor processing unit 220 or a portion thereof) performs the appropriate motion sensor calibration that was noted at 1103 as being needed. When the calibration is finished, the sensor processing unit 220 (or portion thereof) may check the performance of the calibrated motion sensor(s) 450 to verify that the calibration was successful. The method then returns to 1101 or 1102 to continue gaming engine execution and monitoring of motion sensor performance.

Figure 12:
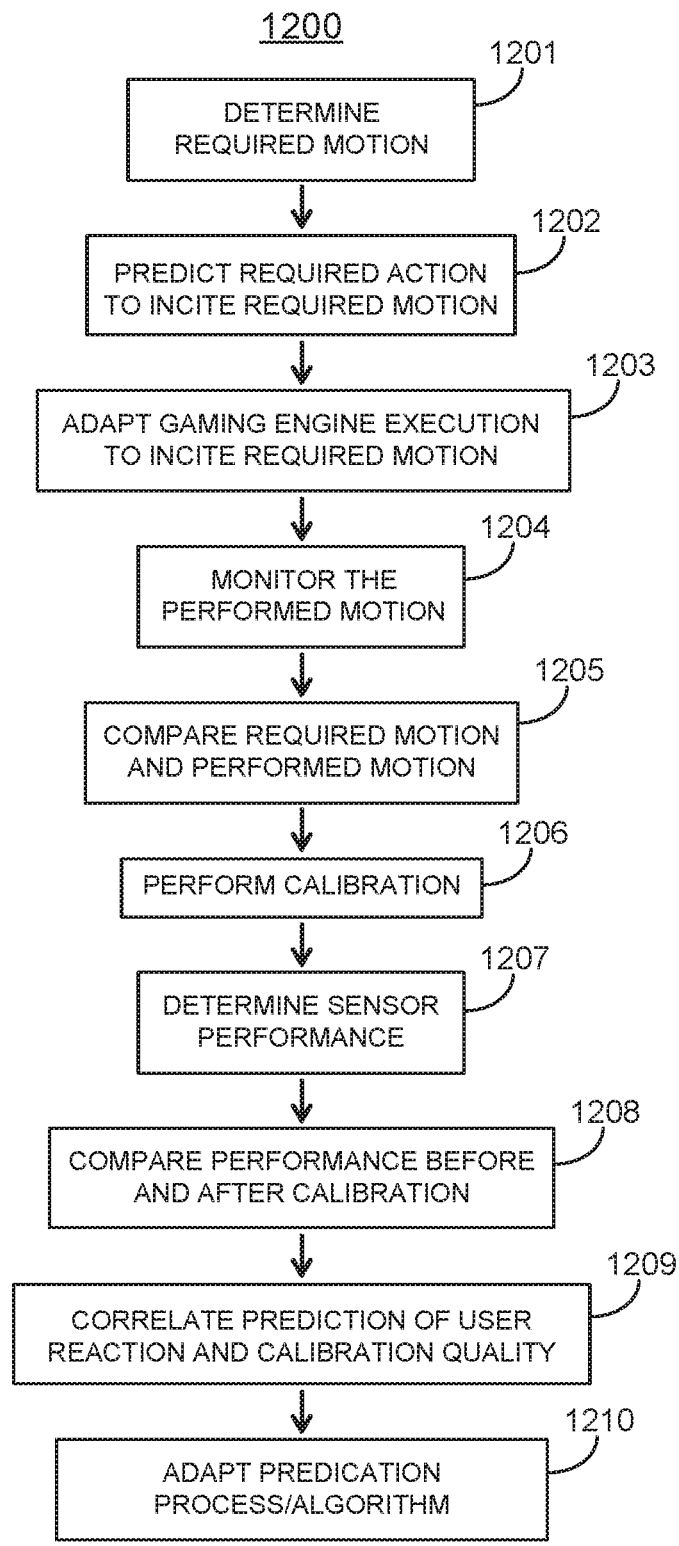
FIG. 12 illustrates a flow diagram of an example method of using adaptive learning in inciting user action for sensor calibration, in accordance with various aspects of the present disclosure.

FIG. 12 illustrates a flow diagram 1200 of an example method of using adaptive learning in inciting user action for sensor calibration, in accordance with various aspects of the present disclosure. It is appreciated that in some embodiments, the procedures may be performed in a different order than described, that some of the described procedures may not be performed, and/or that one or more additional procedures to those described may be performed. Flow diagram 1200 includes some procedures that, in various embodiments, are carried out by one or more processors (e.g., sensor processor 430, application processor 210, or the like) under the control of computer-readable and computer-executable instructions that are stored on non-transitory computer-readable storage media (e.g., application memory 211, internal memory 440, or the like). It is further appreciated that one or more procedures described in flow diagram 1200 may be implemented in hardware, or a combination of hardware with firmware and/or software.

The adaptive learning described in conjunction with flow diagram 1200 is used to predict the reaction of a user to an action from the system/application. Such predictions facilitate selecting the correct application content (e.g., game content) to generate in order to incite a particular action from the user that will be useful for the calibration of a sensor. In discussion of flow diagram 1200 the previous example of the shooting game is employed. It has been noted that in most situations the general motion reaction of the user during game play in response to generated game content is very predictable. For example, a game character presented on the left side of displayed content will predictably cause a user to rotate their head to the left to observe/target the game character. The question, in this example case, is how much leftward rotation will be incited. There may be variations between users and/or between different game content presentations, which can be learned and for which compensation in sensor performance may be introduced. To improve performance, and to better predict the reaction of a user, adapting and learning from previous action-reaction combinations may be employed in some embodiments. Additionally, learning can be employed to determine how effective an incited user reaction is in helping with the calibration of a sensor and increasing sensor performance.

Referring now to 1201 of FIG. 12, it is determined which user action/motion is required in order to perform calibration on one or more sensors (such as motion sensors 450). The determination may be performed by any suitable portion(s) of system 100, such as by application processor 210, gaming engine 242, electronic device 101, user interface 102, and/or by sensor processing unit 220.

At 1202, once the required motion is determined, the required action to incite to correct reaction (e.g., user motion input) is predicted by system 100. This prediction may be based on average users or on high level rules, and may, in the initial stage, not yet be adapted to the user.

At 1203 system 100 adapts execution of gaming engine 242 to incite the motion. This includes gaming engine 242 adapting/modifying the gameplay of the game, while it is running, by generating the events/modifications as game content to be presented to the user.

At 1204 system 100 or a component thereof (e.g., a monitoring entity) monitors the performed action. The monitoring entity may be one or some combination of electronic system 100, electronic device 101, and sensor processing unit 220; and the monitoring entity may additionally or alternatively comprise one or more applications (e.g., gaming application 241, gaming engine 242, performance module 431, and/or calibration module 433). The sensor(s) may be one or more of motion sensors 450, and/or other types of sensors.

At 1205 system 100 or a portion thereof (e.g., electronic device 101, user interface 102, sensor processing unit 220, and/or sensor(s) such as motion sensor(s) 450) compares the performed action with the desired action that the gaming engine 242 intended to incite. If a difference between the required motion and the performed motion is within a threshold, the system may continue to the next procedure. However, if a difference between the required motion and the performed motion is larger a predetermined threshold, the system may decide that the performed motion is not adequate or accurate enough to perform the calibration. The system may learn from the difference between the required motion and performed motion to improve the prediction of the required action to incite the required motion in procedure 1202. For example, if the amplitude or direction of the motion where not as required, the predicting may be adapted for the next cycle. The system may need to execute a few cycles before the prediction of the required action to incite the required motion in 1202 is accurate enough so that the system can actually move on to procedure 1206. In other words, the system may start with high level rules and/or algorithms to predict the required action to incite the required motion, and through one or more cycles adapt these rules and/or algorithms to the users and/or gaming application. In some embodiments, no initial rules or algorithms may be used, and the system will learn the predictions based on the user game play, i.e., the motion/actions of the users as a reaction of the motion/action in the game.

At 1206, when the performed action/motion matches closely enough to the desired action for calibration to successfully (i.e., the performed action is determined at procedure 1205 to be within a threshold or predetermined acceptable range), system 100 or a component thereof (e.g., electronic device 101, user interface 102, sensor processing unit 220, and/or sensor(s) such as motion sensor(s) 450) directs calibration and calibration is performed on the sensor for which the user action/motion was incited.

At 1207, when the calibration of the sensor is finished, system 100 (or a portion thereof such as sensor processing unit 220, sensor processor 430, application processor 210, and/or gaming engine 242) may check the performance of the calibrated sensor(s) to verify that the calibration was successful.

At 1208 system 100 (or a portion thereof such as sensor processing unit 220, sensor processor 430, application processor 210, and/or gaming engine 242) compares performance of the sensor before and after the calibration to determine the performance change (increase, decrease, or no change) due to the calibration.

At 1209 system 100, or a portion thereof, correlates the prediction of user reaction and the calibration quality resulting from the user incited action. Through this process, system 100 and its various components can coordinate with one another to learn how accurately the required/incited user reaction can be predicted, and how the accuracy of this prediction influences the calibration. If the calibration process does not require a very strict motion (pattern), the quality of the prediction may be less important because the system can still perform the calibration appropriately.

At 1210, when a poor prediction produces a user reaction that does not enable correct calibration, the prediction process, algorithm for predicting, and/or gaming engine 242 is adapted via this coordination in system 100 to adjust the predictions and/or content generation, and therefore incite improved user reactions/motions for the purpose of future sensor calibrations. These adaptations can be carried out through well-known machine learning techniques that are available to the person skilled in the art. The adaptions result in system 100 "learning" from the difference between the predicted user action/motion and the performed user action/motion, by adapting the actions of system 100 so that a prediction gets the desired user reaction (e.g., user action/motion) from generated game content. By way of example, the adaptation/learning may involve using regression techniques, estimator models, neural networks, or other known mechanisms for estimating error/deviation and adjusting to compensate.

The example embodiments discussed above directly use the incited motion to calibrate the motion sensors. In some embodiments, however, the incited motion is used indirectly, meaning the motion is used to bring the device to a certain location/position and/or into a certain orientation. In other words, through adaptation by the gaming engine, the system incites the user to bring the device to a certain location/position and/or in a certain orientation. The location/position and/or orientation may be a reference, home, or starting point from which further calibration of motion sensors 450 can be performed. The location/position and/or orientation may be a reference or home which it itself checks or facilitates calibration of one or more of motion sensors 450. The location/position may also be a location such as a home, reference, or starting point from which a characteristics map is either created or from which the characteristics map can be calibrated/validated. The location may be a location relative to the user, for example, in the immediate vicinity of the user. For example, the user may be incited to move a handheld device to a certain location in space and/or in a certain orientation with respect to the (body of) the user. In the examples above where a HMD and a handheld controller were discussed, this would mean that through the adapted gameplay, the system may incite the user to move (the user's head) to a certain location, and/or to move the handheld controller to a certain location or position in the 3D space. In one embodiment, the user is incited to bring the device to various location/positions (in 2D or 3D space) to calibrate the motion sensors by mapping out the location characteristics, such as e.g., the magnetic characteristics of the location. Once the calibration is performed and the 2D/3D space of interest is mapped, the thus created characteristics map may be used to determine the location.

Example Methods of Operation

FIGS. 13A, 13B, 13C, and 13D illustrate a flow diagram 1300 of an example method of motion sensor calibration, in accordance with various aspects of the present disclosure. Procedures of this method will be described with reference to elements and/or components of one or more of FIGS. 1-12. It is appreciated that in some embodiments, the procedures may be performed in a different order than described, that some of the described procedures may not be performed, and/or that one or more additional procedures to those described may be performed. Flow diagram 1300 includes some procedures that, in various embodiments, are carried out by one or more processors (e.g., sensor processor 430, application processor 210, or the like) under the control of computer-readable and computer-executable instructions that are stored on non-transitory computer-readable storage media (e.g., application memory 211, internal memory 440, or the like). It is further appreciated that one or more procedures described in flow diagram 1300 may be implemented in hardware, or a combination of hardware with firmware and/or software.

With reference to FIG. 13A, at procedure 1310 of flow diagram 1300, in various embodiments a motion with which to calibrate a motion sensor 450 is determined. The motion may be a movement or pattern of movement that the motion sensor needs to experience during a calibration process and may involve movement on one axis or multiple axes. It should be appreciated that many motion sensors have calibration modes or established techniques for calibration, and the motions required for calibrating these sensors on various axes are known and can be stored in a memory such as application memory 211, memory 440, or in a memory on board the sensor being calibrated. The motion sensor 450 may be a gyroscope 451, an accelerometer 453, a magnetometer 455, pressure sensor 457, and/or other motion sensor. The motion sensor 450 is often controlled by a sensor processor, such as sensor processor 430 of sensor processing unit 220 but may be controlled by another processor in a user interface 102, electronic device 101, or system 100 that includes the motion sensor 450. In some embodiments, the motion sensor 450 is comprised within and as a portion of a user interface, such as user interface 102. The user interface 102 is communicatively coupled with a gaming engine, such as gaming engine 242 that is operating on a processor, such as application processor 210. The coupling between the user interface 102 and the application processor 210 may be a tethered or untethered communicative coupling when the user interface 102 is in a separate housing from the application processor 210. The coupling may be over a communication bus when the user interface 102 and the application processor 210 are disposed in the same housing and/or component (e.g., both as part of a multimedia communication device 503). In some embodiments, the determining of the motion may be accomplished by application processor 210, sensor processor 430, a gaming application 241, a gaming engine 242, and/or by the sensor being calibrated. The determination can be made, for example, by matching the type of calibration(s) required (e.g., which axis or axes of a motion sensor 450 need calibrating) and the stored motion(s) for the required calibrations.

Various events can trigger a need for calibrating a motion sensor and determining the motion with which to perform the calibration. Some non-limiting examples of such events include: a change of user; a change of operating condition (e.g., change of temperature, a changed of barometric pressure, etc.); and/or starting an application (e.g., beginning game play of a game). For example, when a gaming engine 242 becomes aware that a new user is operating a user interface such as HMD 502, it may trigger calibration of one or more of the motion sensors 450 in HMD 502, and thus determination of a motion, so that the motion sensors are: 1) well calibrated in general, and/or 2) well calibrated to the inputs of the current user. Calibration may improve accuracy and/or may result in increasing bias, gain, sensitivity, offset, and/or other operating parameter to compensate for changes in range of movement, speed of movement, or the like between two different users (e.g., between an adult user and a child user of a user interface 102). In some embodiments, calibration settings for specific different users may be stored as they are determined. As another example, when operating temperature of a sensor increases and moves out of a preset range, the performance of the motion sensor 450 may change. For example, changes in temperature may cause detrimental changes in drift, tilt, bias, sensitivity and/or by exhibiting non-standard motion data, thus triggering calibration and determination of a motion that needs to be incited to affect the calibration. An increase in heat can be due to body heat from a user, solar radiation, and/or heat produced by other electronics (e.g., graphics processing units, displays, processors, and the like) within a user interface 102. In yet another example, when a user begins game play with a gaming application 241 that operates on or in conjunction with a gaming engine 242, it is a good time to ensure that motion sensors 450 are properly calibrated, and thus a motion for calibration of a sensor may be determined. Other instances that may trigger calibration and determination of a motion include, but are not limited to: a sensor deviating from a predetermined performance range, a sensor value or norm of a sensor value outside a predefined range, a sensor surpassing a predetermined time between calibrations, and/or a sensor surpassing a predetermined number of motion measurements between calibrations.

With continued reference to FIG. 13A, at procedure 1320 of flow diagram 1300, in various embodiments, coordination occurs between sensor processor 430 and the gaming engine 242 regarding the determined motion. This coordination comprises communication between sensor processor 430 and application processor 210 regarding one or both of a description of the motion and the timing of the motion. For example, sensor processor 430 may provide a description to the gaming engine 242 of the motion that needs to be incited to perform calibration of sensor (e.g., a head movement from left to right). Likewise, sensor processor 430 may then receive a timing characteristic from gaming engine 242, such as a specific time or time window when the game content generated to incite the movement will be implemented (presented to the user as game play) and thus expected to incite the movement. Sensor processor 430 uses the timing characteristic to time when to instruct the motion sensor under calibration to enter and exit calibration mode, and thus when to perform calibration. In other instances, gaming engine 242 may receive from sensor processing unit 220 information about the needed calibration, and then determine the motion to incite to assist in the calibration. As part of the coordination, the gaming engine 242 and/or gaming application 241 may predict game content which will incite the user motion with the user interface that is needed to perform the calibration. Gaming engine 242 may provide a timing characteristic and/or other information (e.g., regarding the game play which will be used to incite a motion) to sensor processing unit 220 to assist in timing the calibration of the sensor.

With continued reference to FIG. 13A, at procedure 1330 of flow diagram 1300, in various embodiments, sensor processor 430 monitors the output of the motion sensor under calibration for evidence of the motion made as a user input via user interface 102 in response to game content implemented by the gaming engine 242, based on the coordination, to incite the motion. The monitoring may look for the requested motion, or for any evidence or indication of the requested motion. In one example, any motion detected by the motion sensors may be used as an indication of the motion and may be used to start or initiate a calibration process. The monitoring may take place based on the timing characteristic. For example, at or about the time that the motion is expected to be incited sensor processor 430 may monitor the motion sensor for motion data output that is indicative of the required calibration motion taking place or about to take place. That is, when the motion or a precursor motion occurs or begins at a time associated with the time characteristic, sensor processor 430 may instruct the motion sensor under calibration to begin calibration if it has not already been so instructed. An example of a precursor motion would be motion data showing a user's head turning to the left prior to an expected left to right motion needed for calibration. It should be appreciated that in some embodiments, other aspects or components of an electronic system 100, such as application processor 210, gaming engine 242, performance module 431, and/or calibration module 433 may accomplish or assist with the monitoring.

With continued reference to FIG. 13A, at procedure 1340 of flow diagram 1300, in various embodiments, sensor processor 430 calibrates the motion sensor with the motion that was incited and then made by the user as an input, via the user interface 102, in response to game content of a game being played by the user with the user interface 102. This may comprise sensor processor 430 placing the motion sensor into a calibration mode and removing the motion sensor from calibration mode. As described in 1205 and 1206 of flow diagram 1200, in some embodiments as part of the calibration sensor processor 430 may compare an intended user input in response to the game content with an actual user input in response to the game content, where the actual user input is measured by the motion sensor; and then perform the calibration only if and when the comparison indicates that the actual user response is within a threshold or preestablished range which will allow for a successful calibration. Some embodiments may also comprise sensor processor 430 ensuring the success of calibration and measuring a before/after calibration difference in the performance of the motion sensor (if any). It should be appreciated that in some sensors with onboard processing, the calibration may be carried out by the sensor when the calibration mode is entered. In other embodiments, such as with "dumb" sensors, sensor processor 430 or application processor 210 operates to conduct the calibration as well by adjusting operating characteristics/settings (e.g., the output data rate, full-scale data rate, frame rate, sensitivity, gain, bias, drift, etc.) as required for the sensor being calibrated.

Referring now to FIG. 13B, at procedure 1350 of flow diagram 1300, in various embodiments, the method as described in 1310-1340 further comprises an intended user input (in the form of an intended motion input with the user interface) in response to the game content being compared with an actual user input (in the form of an actual motion input with the user interface) in response to the game content, where the actual user input measured is reflected in motion data measured by the motion sensor. The comparison may be made by a processor, such as sensor processor 430 or application processor 210. The comparison may also be made by an application or module, such as gaming application 241, gaming engine 242, performance module 431, or calibration module 433. The comparison may comprise a comparison of the performed action with the desired action that the gaming engine 242 intended to incite. Reference is made to descriptions of comparisons and responsive actions that are described in conjunction with 1205 of FIG. 12, and which may be employed as part of procedure 1350.

With continued reference to FIG. 13B at procedure 1360 of flow diagram 1300, in various embodiments, the game content is adapted based on the comparison. In a situation where the comparison indicates that desired calibration occurred and was successful in response to user input incited by the generated game, no adaptation of the game content may be required, and the calibration can take place if the actual motion input is in a desired range/threshold. However, when the comparison indicates that the calibration was not completed or not fully successful because the predicted movement was not (sufficiently) incited (e.g., the user moved too much, too little, not at all, or in the incorrect manner), then the game content that was used is modified accordingly and/or the prediction is adapted/revised from this feedback so that next time a similar motion is presented to incite a similar movement as a user input, it will more accurately incite the movement. For example, if a game character such as a zombie 820 moved from left to right across the field of view of a user but incited a user to rotate his head too quickly from left to right for fully successful calibration, then the movement of the zombie 820 may be slowed down the next time it is generated as game content to incite a similar user movement.

Referring now to FIG. 13C, at procedure 1370 of flow diagram 1300, in various embodiments the method as described in 1310-1340 further comprises, comparing performance of the motion sensor(s) 450 before and after the calibrating of procedure 1340 to determine a performance change (if any) of the motion sensor(s) 450 due to the calibrating. If there is no change or a negative change in the performance, the calibrating may not have been successful and might need to be performed again. If there is a positive change in the performance, then the calibration was likely successful or at least partially successful. In some embodiments, calibration may re-accomplished until the desired performance change in the operation of the motion sensor(s) 450 is achieved.

Referring now to FIG. 13D, at procedure 1380 of flow diagram 1300, in various embodiments the method as described in 1310-1340 further comprises, observing the performance of the motion sensor. The performance may be observed by a processor, such as sensor processor 430 or application processor 210. The observation of performance may additionally or alternatively be initiated by and/or the performance may be observed by an application, such as gaming engine 242 or a module such as performance module 431 or calibration module 433. This observation/initiation of observation can occur continuously, at predetermined periodic intervals, or in response to an event such as a temperature sensor recording a temperature that exceeds a predetermined threshold.

With continued reference to FIG. 13D at procedure 1390 of flow diagram 1300, in various embodiments, responsive to the observed performance being outside a predetermined range, the determining described in 1310 is initiated. For example, when the observed performance of a sensor, such as one or more of motion sensors 450, is outside of a predetermined range, calibration is deemed to be required and is thus initiated in a manner that is seamless to the user experience of a running application such as a game operating on gaming engine 242. The predetermined range may be one of normal performance, or it may be an even narrower predetermined range (within the normal performance raged) that associated with heightened performance. The initiation may come from a processor or an application or running on a processor. This initiation can be a precursor to entry into 1310 of flow diagram 1300 and/or can be a continuous feedback loop for the method described in flow diagram 1300 and thus occur after 1340 and control re-entry at 1310.

In some embodiments, the procedures described in 1380 and 1390 may be initiated at the beginning of game play of a game running on gaming engine 242. In some embodiments, the procedures described in 1380 and 1390 may be repeated at predetermined periodic intervals during game play of a game running on gaming engine 242. In some embodiments, the procedures described in 1380 and 1390 may be initiated when the user of a user interface 102 changes.

FIG. 14 illustrates a flow diagram 1400 of an example method of game content generation, in accordance with various aspects of the present disclosure. Procedures of this method will be described with reference to elements and/or components of one or more of FIGS. 1-12. It is appreciated that in some embodiments, the procedures may be performed in a different order than described, that some of the described procedures may not be performed, and/or that one or more additional procedures to those described may be performed. Flow diagram 1400 includes some procedures that, in various embodiments, are carried out by one or more processors (e.g., sensor processor 430, application processor 210, or the like) under the control of computer-readable and computer-executable instructions that are stored on non-transitory computer-readable storage media (e.g., application memory 211, internal memory 440, or the like). It is further appreciated that one or more procedures described in flow diagram 1400 may be implemented in hardware, or a combination of hardware with firmware and/or software.

With reference to FIG. 14, at procedure 1410 of flow diagram 1400, in various embodiments, coordination takes place between a processor and a user interface 102 regarding a motion of the user interface 102 with which to calibrate a motion sensor disposed as a portion of the user interface. The processor may be an application processor, such as application processor 210. The user interface 102 may be co-located with the application processor 210 in a single housing, such as in a multi-media communication device 503. The user interface 102 may also be physically separated from and communicatively coupled in a tethered (wired) or untethered (wireless) manner to the application processor 210. An example of a user interface 102 that is physically separated from an application processor 210 would be a handheld/hand-holdable user interface 501, an HMD 502, and/or a user-wearable user interface such as or a smart wristwatch, used to provide input to an electronic device 101 such as a game console (e.g., a Nintendo Wii™, Sony Play Station®, or the like).

With continued reference to FIG. 14, at procedure 1420 of flow diagram 1400, in various embodiments, based on the coordination, game content is generated by the processor. For example, the game content is generated by a gaming application 241 operating in conjunction with a gaming engine, such as gaming engine 242 that operates on application processor 210. The game content is configured and specifically intended to incite the motion as an input via the user interface from a user of a game implemented by a gaming engine operating on the processor. That is, game characters, situations, sounds, effects, and the like are generated to incite the user to move the user interface 102 in a specific calibration motion or pattern of motions needed for calibration of the senor(s) under calibration. This can include generating one or some combination of audible cues (game sounds) or visual cues (visible game characters and/or graphics along with locations thereof) that are output (in procedure 1430) on a display 103 and/or speaker(s) to incite the motion through game play interaction with the user interface 102 by a user that is playing the game. Various movements may be incited by the generated game content on one or more axes (e.g., 2-axes, 4-axes, 6-axes, etc.) and/or in patterns (such as a figure eight pattern, a plus sign pattern, an X-shaped pattern, among others). It is appreciated that non-game applications can similarly generate application content to incite user movements of a user interface 102 in response to generated application content, and thus the described techniques are not limited strictly to games.

With continued reference to FIG. 14, at procedure 1430 of flow diagram 1400, in various embodiments, the generated game content is then provided by application processor 210 for game play in the game being played by the user via user interface 102. The game is not paused, suspended, or exited, instead the generated content is blended in as actual game play during runtime of the game. This causes the calibration to occur without any explicit knowledge of the calibration by the user. This improves the user experience by not interrupting the game play for calibration and by ensuring the user interface remains well-calibrated during game play.

As previously discussed, application processor 210 and/or gaming engine 242 may track the occurrence of the calibration and/or the results (via a before/after comparison of performance of the calibrated sensor). The results of calibration may be used as feedback to adapt (e.g., via machine learning or other feedback techniques) how application processor 210 and/or gaming engine 242 generates future game content to incite similar user movements of a user interface 102.

Also, as previously discussed, application processor 210 and/or gaming engine 242 may trigger calibration in response to various conditions/events. Some non-limiting examples of such events include: a change of user; a change of operating condition (e.g., change of temperature, a changed of barometric pressure, etc.); and/or starting an application (e.g., beginning game play of a game).

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method of motion sensor calibration, said method comprising:
   determining a motion with which to calibrate a motion sensor, wherein said motion sensor is controlled by a sensor processor, and wherein said motion sensor is comprised within a user interface, said user interface communicatively coupled with a gaming engine;
   coordinating between said sensor processor and said gaming engine regarding said motion;
   monitoring, by said sensor processor, said motion sensor for evidence of said motion made as a user input via said user interface in response to game content implemented by said gaming engine, based on said coordination, to incite said motion; and
   calibrating, by said sensor processor, said motion sensor with said motion.

2. The method of claim 1, further comprising:
   observing performance of said motion sensor; and
   responsive to said performance being outside a predetermined range, initiating said determining a motion with which to calibrate a motion sensor.

3. The method of claim 1, further comprising:
   comparing performance of said motion sensor before and after said calibrating to determine a performance change of said motion sensor due to said calibrating.

4. The method of claim 1, wherein said coordinating between said sensor processor and said gaming engine regarding said motion comprises:
   predicting said game content needed to incite said motion.

5. The method of claim 4, further comprising:
   comparing an intended user input in response to said game content with an actual user input in response to said game content, said actual user input measured by said motion sensor; and
   adapting said predicting based on said comparison.

6. The method of claim 1, wherein said coordinating between said sensor processor and said gaming engine regarding said motion comprises:
   providing, by said sensor processor, a description of said motion to said gaming engine.

7. The method of claim 1, wherein said coordinating between said sensor processor and said gaming engine regarding said motion comprises:
   receiving, by said sensor processor, a description from said gaming engine of a timing characteristic of said game content implemented to incite said user input.

8. The method of claim 7, wherein said monitoring, by said sensor processor, said motion sensor for said motion made as a user input via said user interface in response to game content implemented by said gaming engine, based on said coordination, to incite said motion comprises:
   monitoring said motion sensor for an output indicative of said motion based on said timing characteristic.

9. The method of claim 1, wherein said calibrating, by said sensor processor, said motion sensor with said motion comprises:
   comparing an intended user input in response to said game content with an actual user input in response to said game content, said actual user input measured by said motion sensor; and
   performing the calibration if the comparison is within a threshold.

10. A sensor processing unit comprising:
    a motion sensor, wherein said motion sensor is a portion of a user interface coupled with a gaming engine; and
    a sensor processor, said sensor processor coupled with said motion sensor and configured to control said motion sensor, said sensor processor configured to:
       determine a motion with which to calibrate said motion sensor;
       coordinate with said gaming engine regarding said motion;
       monitor, said motion sensor for evidence of said motion made as a user input via said user interface in response to game content implemented by said gaming engine, based on said coordination, to incite said motion; and
       calibrate said sensor with said motion.

11. The sensor processing unit of claim 10, wherein said motion sensor is configured to:
    send a calibration signal to said sensor processor, wherein said calibration signal identifies a need for said calibration.

12. The sensor processing unit of claim 10, wherein said sensor processor is configured to:
    monitor said motion sensor to identify a need for said calibration.

13. The sensor processing unit of claim 10, wherein said sensor processor is further configured to:
    compare an intended user input in response to said game content with an actual user input in response to said game content, said actual user input measured by said motion sensor; and coordinate with said gaming engine to adapt said game content based on said comparison.

14. The sensor processing unit of claim 10, wherein said sensor processor is further configured to:

observe performance of said motion sensor; and responsive to said performance being outside a predetermined range, initiate said determining.

15. An electronic system comprising:

an application processor configured to implement a gaming engine;

a user interface coupled with said application processor and configured to provide user inputs to said gaming engine, said user interface comprising:

a motion sensor; and a sensor processor, said sensor processor coupled with said motion sensor and configured to control said motion sensor, said sensor processor configured to:

determine a motion with which to calibrate said motion sensor;

coordinate with said gaming engine regarding said motion;

monitor, said motion sensor for evidence of said motion made as a user input via said user interface in response to game content implemented by said gaming engine, based on said coordination, to incite said motion; and calibrate said sensor with said motion.

16. The electronic system of claim 15, wherein said motion sensor is configured to:

send a calibration signal to said sensor processor, wherein said calibration signal identifies a need for said calibration.

17. The electronic system of claim 15, wherein said sensor processor is configured to:

monitor said motion sensor to identify a need for said calibration.

18. The electronic system of claim 15, wherein said sensor processor is further configured to:

compare an intended user input in response to said game content with an actual user input in response to said game content, said actual user input measured by said motion sensor; and coordinate with said gaming engine to adapt said game content based on said comparison.

19. The electronic system of claim 15, wherein said sensor processor is further configured to:

observe performance of said motion sensor; and responsive to said performance being in a predetermined range, initiate said determining.

20. The electronic system of claim 15, wherein said motion sensor is selected from the group of motion sensors consisting of: a gyroscope; an accelerometer; a magnetometer; a pressure sensor; and an inertial sensor.

21. The electronic system of claim 15, wherein said user interface is selected from the group consisting of: a handheld user interface; a human wearable user interface; and a head-mounted display user interface.

* * * * *